(12) United States Patent
Li et al.

(10) Patent No.: US 11,528,239 B2
(45) Date of Patent: Dec. 13, 2022

(54) TIME-SENSITIVE NETWORKING COMMUNICATION METHOD AND APPARATUS FOR CONFIGURING VIRTUAL SWITCHING NODE

(71) Applicant: Huawei Technologies Co., Ltd., Shenzhen (CN)

(72) Inventors: Hancheng Li, Shanghai (CN); Han Zhou, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/225,492

(22) Filed: Apr. 8, 2021

(65) Prior Publication Data
US 2021/0226902 A1    Jul. 22, 2021

Related U.S. Application Data

(63) Continuation of application No. PCT/CN2019/110020, filed on Oct. 8, 2019.

(30) Foreign Application Priority Data

Oct. 8, 2018 (CN) .......................... 201811169312.X

(51) Int. Cl.
*H04L 49/00* (2022.01)
*H04L 12/46* (2006.01)
(Continued)

(52) U.S. Cl.
CPC .......... *H04L 49/70* (2013.01); *H04L 12/4641* (2013.01); *H04L 41/085* (2013.01);
(Continued)

(58) Field of Classification Search
CPC ............. H04L 41/0806; H04L 41/0813; H04L 41/085; H04L 49/70; H04L 12/4641; H04L 49/253; H04L 67/141; H04W 76/11
See application file for complete search history.

(56) References Cited

U.S. PATENT DOCUMENTS 9,262,285 B1 * 2/2016 Wang ................... H04L 67/1097
9,742,588 B2 * 8/2017 Carrie ..................... H04L 61/10
(Continued)

FOREIGN PATENT DOCUMENTS

| CN | 101964996 A | 2/2011 |
| CN | 102638392 A | 8/2012 |

(Continued)

OTHER PUBLICATIONS

3GPP TS 23.501 V15.3.0, "3rd Generation Partnership Project; Technical Specification Group Services and System Aspects; System Architecture for the 5G System; Stage 2 (Release 15)," Sep. 2018, 226 pages.

(Continued)

*Primary Examiner* — Ramy M Osman
(74) *Attorney, Agent, or Firm* — Conley Rose, P.C.

(57) ABSTRACT

A time-sensitive networking communication method and an apparatus, where the method may include: determining, by an application function network element, a virtual switching node identifier corresponding to a port identifier of a user plane function network element; determining a virtual port identifier of a virtual switching node identified by the virtual switching node identifier; obtaining attribute information of the virtual switching node, where the attribute information includes attribute information of a port identified by the port identifier of the user plane function network element and attribute information of a virtual port identified by the virtual port identifier; and sending the attribute information of the virtual switching node to a time-sensitive network, where (Continued)

the attribute information of the virtual switching node is used to request the time-sensitive network to register or update the virtual switching node based on the attribute information of the virtual switching node.

15 Claims, 17 Drawing Sheets

(51) Int. Cl.

| | |
|---|---|
| H04L 49/253 | (2022.01) |
| H04L 67/141 | (2022.01) |
| H04L 67/146 | (2022.01) |
| H04L 41/085 | (2022.01) |
| H04L 41/0813 | (2022.01) |
| H04L 67/147 | (2022.01) |
| H04W 76/11 | (2018.01) |
| H04L 41/0806 | (2022.01) |

(52) U.S. Cl.
CPC ...... *H04L 41/0806* (2013.01); *H04L 41/0813* (2013.01); *H04L 49/253* (2013.01); *H04L 67/141* (2013.01); *H04L 67/146* (2013.01); *H04L 67/147* (2013.01); *H04W 76/11* (2018.02)

(56) References Cited

U.S. PATENT DOCUMENTS

| | | | | |
|---|---|---|---|---|
| 2004/0078772 | A1* | 4/2004 | Balay | H04L 45/586 716/126 |
| 2005/0100048 | A1 | 5/2005 | Chun et al. | |
| 2006/0230219 | A1* | 10/2006 | Njoku | G06F 13/4022 710/316 |
| 2014/0109209 | A1 | 4/2014 | Haynes et al. | |
| 2015/0009946 | A1 | 1/2015 | Dinan | |
| 2015/0222480 | A1* | 8/2015 | Gan | H04L 2101/604 709/222 |
| 2017/0366399 | A1 | 12/2017 | Li et al. | |
| 2017/0366618 | A1 | 12/2017 | Vrzic et al. | |
| 2018/0192390 | A1 | 7/2018 | Li et al. | |
| 2018/0212869 | A1* | 7/2018 | Wu | H04L 45/38 |
| 2019/0253339 | A1* | 8/2019 | Mehmedagic | H04L 45/3065 |
| 2020/0170055 | A1 | 5/2020 | Dou et al. | |
| 2020/0322461 | A1 | 10/2020 | Gotz et al. | |
| 2021/0226902 | A1* | 7/2021 | Li | H04L 67/141 |
| 2021/0274375 | A1* | 9/2021 | Li | H04W 28/10 |
| 2021/0274418 | A1* | 9/2021 | Zhou | H04L 12/4675 |
| 2021/0274585 | A1* | 9/2021 | Yu | H04L 67/146 |

FOREIGN PATENT DOCUMENTS

| | | |
|---|---|---|
| CN | 103313286 A | 9/2013 |
| CN | 107018542 A | 8/2017 |
| CN | 108293072 A | 7/2018 |
| CN | 108366380 A | 8/2018 |
| CN | 108370600 A | 8/2018 |

OTHER PUBLICATIONS

3GPP TS 23.502 V15.3.0, "3rd Generation Partnership Project; Technical Specification Group Services and System Aspects; Procedures for the 5G System; Stage 2 (Release 15)," Sep. 2018, 329 pages.

3GPP TR 23.734 V0.2.0 "3rd Generation Partnership Project; Technical Specification Group Services and System Aspects; Study on 5GS Enhanced support of Vertical and LAN Services (Release 16)," Sep. 2018, 39 Pages.

R2-156813, Qualcomm Incorporated, "WLAN Status Reporting for LWA," 3GPP TSG-RAN WG2 Meeting #92, Anaheim, USA, Nov. 16-20, 2015, 2 pages.

S2-173651, Samsung, "TS 23.502: Updates to Inter NG-RAN Node HO Procedure (Section 4.9.1.2.2)," SA WG2 Meeting #121, May 15-19, 2017, Hangzhou, China, 10 pages.

Huawei et al., "Discussion on system enhancement for TSN logical bridge management," 3GPP TSG-SA WG2 Meeting #130, S2-1900590, Kochi, India, Jan. 21-25, 2019, 4 pages.

Samsung, "TSN bridge Port ID allocation," 3GPP TSG-SA WG2 Meeting #134, S2-1907208, Jun. 24-28, 2019, Sapporo, Japan, 3 pages.

Nokia, et al., "TSN performance requirements evaluation", 3GPP TSG-RAN WG2 Meeting #103bis R2-1814992, Chengdu, China, Oct. 8-12, 2018, 9 Pages.

Nokia et al., "Integration of the 5G System in a TSN network", SA WG2 Meeting #128-Bis S2-18xxxx, Aug. 20-24, 2018, Sophia Antipolis, 7 Pages.

Huawei, et al., "Solution for system enhancement to support TSN", SA WG2 Meeting #128-Bis S2-188299, Aug. 20-24, 2018, 3 pages.

\* cited by examiner

TIME-SENSITIVE NETWORKING COMMUNICATION METHOD AND APPARATUS FOR CONFIGURING VIRTUAL SWITCHING NODE

CROSS-REFERENCE TO RELATED APPLICATIONS

This application is a continuation of International Patent Application No. PCT/CN2019/110020, filed on Oct. 8, 2019, which claims priority to Chinese Patent Application No. 201811169312.X, filed on Oct. 8, 2018. The disclosures of the aforementioned applications are hereby incorporated by reference in their entireties.

TECHNICAL FIELD

Embodiments of this application relate to the field of communications technologies, and specifically, to a time-sensitive networking communication method and an apparatus.

BACKGROUND

Time-sensitive networking (TSN) can help ensure real-time performance and certainty of the Ethernet, ensure reliability of data transmission of a time-sensitive service, and predict an end-to-end transmission delay. The TSN overcomes a disadvantage that the conventional Ethernet cannot provide transmission with high reliability and a specific delay, and can meet a requirement in a field such as vehicle control or industrial internet. The TSN includes a switching node (bridge) and a data terminal (end station). The switching node may forward a packet according to a forwarding rule configured or created by the switching node. Data terminals may be classified into a transmit end (talker) and a receive end (listener).

To implement deterministic end-to-end transmission in a 5th generation (5G) mobile communications system, an assumption that the 5G system may be virtualized as the switching node in the TSN and implement a function of the switching node in the TSN is proposed. Specifically, based on a current network architecture of the 5G system, a control plane of a TSN adaptation function is added to an application function (AF) network element, and user planes of the TSN adaptation function are added to a user plane function (UPF) network element and a user equipment (UE). The AF network element, the UPF network element, the UE, and the 5G system jointly constitute a logical switching node (logical bridge), namely, a virtual switching node, which serves as the switching node in the TSN.

Although the assumption that the 5G system is virtualized as the switching node in the TSN is proposed, how to specifically implement deterministic transmission in the 5G system is not proposed. Therefore, how to implement deterministic transmission in the 5G system is an urgent technical problem to be resolved.

SUMMARY

Technical solutions in embodiments of this application are to provide a time-sensitive networking communication method and an apparatus. A 5G system is virtualized as a switching node in a TSN, the 5G system obtains attribute information of the virtual switching node, and registers or updates the virtual switching node based on the attribute information to the TSN, to implement deterministic transmission in the 5G system.

A first aspect of the embodiments of this application provides a time-sensitive networking communication method, including: determining, by an application function network element, a virtual switching node identifier corresponding to a port identifier of a user plane function network element; determining, by the application function network element, a virtual port identifier of a virtual switching node identified by the virtual switching node identifier; obtaining, by the application function network element, attribute information of the virtual switching node, where the attribute information includes attribute information of a physical port identified by the port identifier of the user plane function network element and attribute information of a virtual port identified by the virtual port identifier; and sending, by the application function network element, the attribute information of the virtual switching node to a time-sensitive network, where the attribute information of the virtual switching node is used to request the time-sensitive network to register or update the virtual switching node based on the attribute information of the virtual switching node.

A port of the user plane function network element may be, for example, an actual physical port of the user plane function network element. The virtual switching node is a switching node that is in the time-sensitive network and as which a 5G system is virtualized. Ports of the virtual switching node include the virtual port and the port of the user plane function network element.

The virtual port of the virtual switching node is a virtual port on a user terminal side. The virtual port may be at a granularity of a user terminal, and different user terminals correspond to different virtual ports. Alternatively, the virtual port may be at a granularity of a protocol data unit (PDU) session, and different PDU sessions correspond to different virtual ports. Alternatively, the virtual port may be at a granularity of a TSN domain, and different TSN domains correspond to different virtual ports.

The attribute information of the physical port identified by the port identifier of the user plane function network element may include the port identifier, external topology information of the port, and an external transmission delay of the port. The attribute information of the virtual port identified by the virtual port identifier may include the virtual port identifier, external topology information of the virtual port, and an external transmission delay of the virtual port.

According to the first aspect of the embodiments of this application, the application function network element determines the virtual switching node identifier corresponding to the port identifier of the user plane function network element, and determines the virtual port identifier of the virtual switching node identified by the virtual switching node identifier. Then, the application function network element obtains the attribute information of the virtual switching node, and sends the attribute information of the virtual switching node to the time-sensitive network. Additionally, the time-sensitive network registers or updates the virtual switching node. How to determine the virtual switching node identifier, the virtual port identifier, and the attribute information of the virtual switching node is specified. This helps the application function network element request the time-sensitive network to register or update the virtual switching node. Because the virtual switching node is the switching node that is in the time-sensitive network and as which the 5G system is virtualized, deterministic transmission in the 5G system can be implemented.

In a possible implementation, the application function network element receives a first message from the user plane function network element, where the first message includes the port identifier of the user plane function network element. In other words, the user plane function network element reports, to the application function network element through the first message in advance, the port identifier configured by the user plane function network element. The application function network element performs, for the reported port identifier, at least one of creating the virtual switching node or allocating the virtual switching node identifier. As such, the application function network element establishes and maintains a correspondence between a port identifier of a user plane function network element and a virtual switching node identifier.

Optionally, the first message includes an identifier of the user plane function network element. In other words, the user plane function network element reports the identifier of the user plane function network element to the application function network element through the first message in advance. The application function network element performs, for the user plane function network element, at least one of creating the virtual switching node or allocating the virtual switching node identifier for the port of the user plane function network element. As such, the application function network element establishes and maintains a correspondence between a virtual switching node identifier, and an identifier of the application function network element and/or a port identifier of the application function network element.

Optionally, the first message includes an identifier of the user plane function network element and the port identifier of the user plane function network element. The application function network element performs at least one of creating the virtual switching node or allocating the virtual switching node identifier. As such, the application function network element establishes and maintains a correspondence between a virtual switching node identifier, an identifier of a user plane function network element, and a port identifier of the user plane function network element.

The first message may be directly sent by the user plane function network element to the application function network element. Alternatively, the first message may be first sent by the user plane function network element to a session management network element, and then sent by the session management network element to the application function network element. In this case, the session management network element may learn of content included in the first message.

In a possible implementation, when receiving the first message including the port identifier of the user plane function network element, the application function network element creates a virtual switching node corresponding to the port identifier of the user plane function network element, and allocates a virtual switching node identifier to the virtual switching node, to determine the virtual switching node identifier corresponding to the port identifier of the user plane network element, and determine a virtual port identifier corresponding to the virtual switching node identifier.

After allocating the virtual switching node identifier, the application function network element may directly notify the user plane function network element of the allocated virtual switching node identifier. Alternatively, the application function network element may notify the user plane function network element the allocated virtual switching node identifier through the session management network element. In this case, the session management network element may learn of the virtual switching node identifier.

In a possible implementation, when the first message includes the port identifier of the user plane function network element and the virtual switching node identifier corresponding to the port identifier, the application function network element directly determines, from the first message, the virtual switching node identifier corresponding to the port identifier of the user plane network element, to determine a virtual port identifier corresponding to the virtual switching node identifier.

This implementation is implemented when the user plane function network element preconfigures a correspondence between a port identifier and a virtual switching node identifier. The user plane function network element reports, to the application function network element, the port identifier and the virtual switching node identifier that are configured by the user plane function network element. In this case, if the application function network element has not created the virtual switching node identified by the virtual switching node identifier, the application function network element may create the virtual switching node identified by the virtual switching node identifier. If the application function network element has created the virtual switching node identified by the virtual switching node identifier, the application function network element may add, to the virtual switching node, the port identified by the port identifier of the user plane function network element.

In a possible implementation, configuration information is configured on the application function network element, where the configuration information includes a correspondence between a port identifier of a user plane function network element and a virtual switching node identifier. When receiving the first message including the port identifier of the user plane function network element, the application function network element may obtain, from the configuration information, the virtual switching node identifier corresponding to the port identifier, to determine a virtual port identifier corresponding to the virtual switching node identifier.

In this case, if the application function network element has not created the virtual switching node identified by the virtual switching node identifier, the application function network element may create the virtual switching node identified by the virtual switching node identifier. If the application function network element has created the virtual switching node identified by the virtual switching node identifier, the application function network element may add, to the virtual switching node, the port identified by the port identifier of the user plane function network element.

After determining the virtual switching node identifier based on the configuration information, the application function network element may directly notify the user plane function network element of the determined virtual switching node identifier. Alternatively, the application function network element may notify the user plane function network element of the determined virtual switching node identifier through the session management network element. In this case, the session management network element may learn of the virtual switching node identifier.

In a possible implementation, the first message further includes a time-sensitive networking identifier corresponding to the port identifier of the user plane function network element, where the time-sensitive networking identifier may be at least one of a virtual local area network identifier or class of service information. The time-sensitive networking identifier is used to identify a time-sensitive networking domain to which the port of the user plane function network element belongs, such that the application function network element can learn of the time-sensitive networking domain to which the port of the user plane function network element belongs.

In a possible implementation, the application function network element receives a second message from a session management network element, where the second message is used to request the application function network element to allocate the virtual port identifier, and includes at least one of the virtual switching node identifier or an identifier of the user plane function network element.

If the second message includes the virtual switching node identifier, the application function network element directly adds the virtual port to the virtual switching node identified by the virtual switching node identifier, and allocates the virtual port identifier to the added virtual port.

If the second message includes the identifier of the user plane function network element, the application function network element determines a virtual switching node identifier corresponding to the identifier of the user plane function network element (based on configuration information or a maintained correspondence), then adds the virtual port to a virtual switching node identified by the virtual switching node identifier, and allocates the virtual port identifier to the added virtual port.

The virtual port identifier allocated by the application function network element is unique on the virtual switching node. The virtual port identifier is allocated by the application function network element. This is implemented directly and fast.

After allocating the virtual port identifier to the virtual switching node, the application function network element may notify the session management network element of the allocated virtual port identifier. As such, the session management network element learns of the virtual port identifier of the virtual switching node.

In a possible implementation, the application function network element may allocate the virtual port identifier in a process in which a user terminal establishes a PDU session. For example, in the process in which the user terminal establishes the PDU session, the session management network element selects a user plane function network element for the PDU session, and then sends an identifier of the selected user plane function network element to the application function network element. When receiving the identifier of the user plane function network element, the application function network element may determine a virtual switching node identifier corresponding to the identifier of the user plane function network element (based on configuration information or a maintained correspondence), namely, a virtual switching node identifier corresponding to the PDU session. Then, the application function network element allocates the virtual port identifier to a virtual switching node identified by the virtual switching node identifier.

Optionally, if the virtual switching node identifier corresponding to the PDU session is the same as a previously reported virtual switching node identifier corresponding to a port identifier of a user plane function network element, the application function network element may establish a port pair relationship (namely, a correspondence between a virtual port and a port of the user plane function network element) of the virtual switching node.

Then, the application function network element may notify the session management network element of the allocated virtual port identifier, such that the session management network element learns of a virtual port identifier of a virtual switching node corresponding to the PDU session. The application function network element may further notify the session management network element of the virtual switching node identifier corresponding to the PDU session, such that the session management network element learns of the virtual switching node identifier corresponding to the PDU session.

Optionally, the session management network element may send, to the application function network element, the virtual switching node identifier corresponding to the PDU session. When receiving the virtual switching node identifier, the application function network element allocates the virtual port identifier to the virtual switching node identified by the virtual switching node identifier. If the session management network element configures or maintains a correspondence between an identifier of a user plane function network element and a virtual switching node identifier, after selecting the user plane function network element for the PDU session, the session management network element sends, to the application function network element, the virtual switching node identifier corresponding to the identifier of the selected user plane function network element.

Optionally, the session management network element may send, to the application function network element, the identifier of the selected user plane function network element and the virtual switching node identifier corresponding to the PDU session. The application function network element may directly allocate the virtual port identifier to the virtual switching node identified by the virtual switching node identifier. The application function network element may further determine, based on the identifier of the user plane function network element, the virtual switching node identifier corresponding to the identifier of the user plane function network element. If the virtual switching node identifier is the same as the virtual switching node identifier corresponding to the PDU session, the application function network element may establish a port pair relationship of the virtual switching node.

In a possible implementation, the application function network element receives a second message from a session management network element, where the second message is used to request the application function network element to add the virtual port, includes at least one of the virtual switching node identifier or an identifier of the user plane function network element, and further includes the virtual port identifier of the virtual switching node identified by the virtual switching node identifier. The application function network element obtains the virtual port identifier from the second message, and adds the virtual port identified by the virtual port identifier to a virtual switching node, to be more specific, adds the virtual port to the virtual switching node identified by the virtual switching node identifier included in the second message, or a virtual switching node identified by a virtual switching node identifier corresponding to the identifier of the user plane function network element. In this implementation, the session management network element allocates the virtual port identifier, and notifies the application function network element of the allocated virtual port identifier. The application function network element does not need to allocate the virtual port identifier. This can reduce processing load of the application function network element.

In a possible implementation, in a process in which a user terminal establishes a PDU session, the session management network element allocates the virtual port identifier to the PDU session, and sends the allocated virtual port identifier to the application function network element. For example, in the process in which the user terminal establishes the PDU session, the session management network element selects a user plane function network element and/or a port of a user plane function network element for the PDU session. When the session management network element configures or maintains a correspondence between a virtual switching node identifier, and an identifier of a user plane function network element and/or a port identifier of a user plane function network element, the session management network element determines a virtual switching node identifier corresponding to the selected user plane function network element and/or port of the user plane function network element, and allocates the virtual port identifier to a virtual switching node identified by the virtual switching node identifier.

In a possible implementation, the application function network element receives a third message from the user plane function network element, where the third message is used to request the application function network element to add the virtual port, and includes the virtual port identifier of the virtual switching node identified by the virtual switching node identifier. The application function network element obtains the virtual port identifier from the third message, and adds the virtual port identified by the virtual port identifier to a virtual switching node, where the virtual switching node is a virtual switching node corresponding to the port identifier of the user plane function network element. In this implementation, the user plane function network element allocates the virtual port identifier, and notifies the application function network element of the allocated virtual port identifier. The application function network element does not need to allocate the virtual port identifier. This can reduce processing load of the application function network element. In addition, because the user plane function network element reports both the port identifier of the user plane function network element and the virtual port identifier, the application function network element can quickly determine and establish a port pair relationship of the virtual switching node corresponding to the port identifier.

The virtual port identifier sent by the user plane function network element to the application function network element may be directly sent to the application function network element, or may be sent to the application function network element through a session management network element. In this case, the session management network element may learn of the virtual port identifier.

In a possible implementation, in a process in which a UE establishes a PDU session, the session management network element allocates the virtual port identifier to the PDU session, and sends the allocated virtual port identifier to the application function network element. For example, after the session management network element or the application function network element determines a virtual switching node identifier corresponding to the PDU session, when receiving a request message from the session management network element, the user plane function network element allocates the virtual port identifier to a virtual switching node corresponding to the PDU session. Alternatively, when obtaining data network information, the application function network element determines that the PDU session has a deterministic transmission requirement, and then allocates the virtual port identifier to a virtual switching node corresponding to the PDU session.

The application function network element may obtain the data network information from the session management network element, or obtain the data network information in another manner. The data network information is used to indicate that a data network is a deterministic transmission network.

In a possible implementation, when determining the virtual switching node identifier, the application function network element may send a fourth message to the session management network element, where the fourth message includes the virtual switching node identifier. Then, the session management network element sends the fourth message to a user terminal, such that the user terminal learns of the virtual switching node identifier and sends the virtual switching node identifier to a peer device, and the peer device may send the virtual switching node identifier to a time-sensitive network. The session management network element learns of the virtual switching node identifier through the fourth message, or may learn of the virtual switching node identifier in another manner. For example, when the user plane function network element sends the first message through the session management network element, the session management network element may learn of the virtual switching node identifier corresponding to the port identifier of the user plane function network element.

Optionally, the fourth message further includes the virtual port identifier. The virtual port identifier may be allocated by the application function network element, the session management network element, or the user plane function network element. The fourth message carries the virtual port identifier, such that the user terminal sends the virtual port identifier to the peer device, and the peer device may send the virtual port identifier to the time-sensitive network.

Optionally, the fourth message further includes a time-sensitive networking identifier corresponding to the virtual port identifier, where the time-sensitive networking identifier is used to identify a time-sensitive networking domain to which the virtual port identified by the virtual port identifier belongs, such that the user terminal sends, to the peer device, the time-sensitive networking identifier corresponding to the virtual port identifier, and the peer device may send the time-sensitive networking identifier corresponding to the virtual port identifier to the time-sensitive network.

In a possible implementation, the attribute information of the virtual switching node further includes an internal processing delay between the port of the user plane function network element and the virtual port, to determine an internal transmission delay of deterministic transmission in the 5G system, to ensure an end-to-end transmission delay in the 5G system.

A second aspect of the embodiments of this application provides an application function network element, and the application function network element has a function of implementing the method according to the first aspect. The function may be implemented by hardware, or may be implemented by hardware executing corresponding software. The hardware or the software includes one or more modules corresponding to the foregoing function.

In a possible implementation, the application function network element includes a processing unit and a transceiver unit. The processing unit is configured to: determine a virtual switching node identifier corresponding to a port identifier of a user plane function network element; determine a virtual port identifier of a virtual switching node identified by the virtual switching node identifier; and obtain attribute information of the virtual switching node, where the attribute information includes attribute information of a physical port identified by the port identifier of the user plane function network element and attribute information of a virtual port identified by the virtual port identifier. The transceiver unit is configured to send the attribute information of the virtual switching node to a time-sensitive network, where the attribute information of the virtual switching node is used to request the time-sensitive network to register or update the virtual switching node based on the attribute information of the virtual switching node.

In a possible implementation, the application function network element includes a processor, a transceiver, and a memory. The memory stores a computer program, and the computer program includes a program instruction. The processor is configured to invoke program code to perform the following operations: determining a virtual switching node identifier corresponding to a port identifier of a user plane function network element; determining a virtual port identifier of a virtual switching node identified by the virtual switching node identifier; obtaining attribute information of the virtual switching node, where the attribute information includes attribute information of a physical port identified by the port identifier of the user plane function network element and attribute information of a virtual port identified by the virtual port identifier; and controlling the transceiver to send the attribute information of the virtual switching node to a time-sensitive network, where the attribute information of the virtual switching node is used to request the time-sensitive network to register or update the virtual switching node based on the attribute information of the virtual switching node.

Based on a same concept, for a problem-resolving principle and beneficial effects of the application function network element, refer to the method and beneficial effects brought by the method according to the first aspect. Therefore, for implementation of the apparatus, refer to the implementation of the method. Repeated parts are not described again.

A third aspect of the embodiments of this application provides a computer-readable storage medium. The computer-readable storage medium stores an instruction, and when the instruction is run on a computer, the computer is enabled to perform the method according to the first aspect.

A fourth aspect of the embodiments of this application provides a computer program product including an instruction. When the computer program product runs on a computer, the computer is enabled to perform the method according to the first aspect.

A fifth aspect of the embodiments of this application provides a time-sensitive networking communication method, including: receiving, by a session management network element, an establishment/modification request for a PDU session; selecting a user plane function network element for the PDU session; and sending, by the session management network element, a second message to an application function network element, where the second message includes at least one of an identifier of the user plane function network element or a virtual switching node identifier corresponding to the PDU session, and the second message is used to request the application function network element to allocate a virtual port identifier to the PDU session.

A sixth aspect of the embodiments of this application provides a time-sensitive networking communication method, including: receiving, by a session management network element, an establishment/modification request for a PDU session; selecting a user plane function network element for the PDU session; allocating, by the session management network element, a virtual port identifier to the PDU session; and sending, by the session management network element, a second message to an application function network element, where the second message includes the virtual port identifier.

A seventh aspect of the embodiments of this application provides a time-sensitive networking communication method, including: receiving, by a session management network element, an establishment/modification request for a PDU session; selecting a user plane function network element for the PDU session; and sending, by the session management network element, an N4 session establishment/modification request to the user plane function network element, where the N4 session establishment/modification request is used to request the user plane function network element to allocate a virtual port identifier to the PDU session.

In a process of establishing/modifying the PDU session, in the fifth aspect, the session management network element requests the application function network element to allocate the virtual port identifier to the PDU session. In the sixth aspect, the session management network element allocates the virtual port identifier to the PDU session. In the seventh aspect, the session management network element triggers the user plane function network element to allocate the virtual port identifier to the PDU session, to implement deterministic transmission in a 5G system.

With reference to the fifth aspect to the seventh aspect, in a possible implementation, the establishment/modification request for the PDU session includes at least one of a TSN identifier or data network name (DNN) information. Additionally, the session management network element selects the user plane function network element for the PDU session based on at least one of the TSN identifier or the DNN information. In this case, the selected user plane function network element is a user plane function network element in a TSN domain corresponding to the TSN identifier, or a user plane function network element corresponding to the DNN information.

With reference to the fifth aspect to the seventh aspect, in a possible implementation, the session management network element selects, based on a TSN identifier corresponding to the PDU session, the user plane function network element for the PDU session from a TSN domain identified by the TSN identifier. The TSN identifier corresponding to the PDU session is from a policy control function network element or a unified data management network element.

With reference to the fifth aspect to the seventh aspect, in a possible implementation, when determining that the PDU session has a deterministic transmission requirement, the session management network element selects, for the PDU session, a user plane function network element that supports deterministic transmission.

In the foregoing three possible implementations, because the user plane function network element selected by the session management network element can support deterministic transmission, deterministic transmission in the 5G system can be implemented.

An eighth aspect of the embodiments of this application provides a session management network element, and the session management network element has a function of implementing the method according to any one of the fifth aspect to the seventh aspect. The function may be implemented by hardware, or may be implemented by hardware executing corresponding software. The hardware or the software includes one or more modules corresponding to the foregoing function.

Corresponding to the fifth aspect, in a possible implementation, the session management network element includes a transceiver unit and a processing unit. The transceiver unit is configured to receive an establishment/modification request for a PDU session. The processing unit is configured to select a user plane function network element for the PDU session. The transceiver unit is further configured to send a second message to an application function network element, where the second message includes at least one of an identifier of the user plane function network element or a virtual switching node identifier corresponding to the PDU session, and the second message is used to request the application function network element to allocate a virtual port identifier to the PDU session. In a possible implementation, the application function network element includes a processor, a transceiver, and a memory. The memory stores a computer program, and the computer program includes a program instruction. The processor is configured to invoke program code to perform the following operations: controlling the transceiver to receive an establishment/modification request for a PDU session; selecting a user plane function network element for the PDU session; and controlling the transceiver to send a second message to an application function network element, where the second message includes at least one of an identifier of the user plane function network element or a virtual switching node identifier corresponding to the PDU session, and the second message is used to request the application function network element to allocate a virtual port identifier to the PDU session.

Corresponding to the sixth aspect, in a possible implementation, the session management network element includes a transceiver unit and a processing unit. The transceiver unit is configured to receive an establishment/modification request for a PDU session. The processing unit is configured to select a user plane function network element for the PDU session, and allocate a virtual port identifier to the PDU session. The transceiver unit is further configured to send a second message to an application function network element, where the second message includes the virtual port identifier. In a possible implementation, the application function network element includes a processor, a transceiver, and a memory. The memory stores a computer program, and the computer program includes a program instruction. The processor is configured to invoke program code to perform the following operations: controlling the transceiver to receive an establishment/modification request for a PDU session; selecting a user plane function network element for the PDU session; allocating a virtual port identifier to the PDU session; and controlling the transceiver to send a second message to an application function network element, where the second message includes the virtual port identifier.

Corresponding to the seventh aspect, in a possible implementation, the session management network element includes a transceiver unit and a processing unit. The transceiver unit is configured to receive an establishment/modification request for a PDU session. The processing unit is configured to select a user plane function network element for the PDU session. The transceiver unit is further configured to send an N4 session establishment/modification request to the user plane function network element, where the N4 session establishment/modification request is used to request the user plane function network element to allocate a virtual port identifier to the PDU session. In a possible implementation, the application function network element includes a processor, a transceiver, and a memory. The memory stores a computer program, and the computer program includes a program instruction. The processor is configured to invoke program code to perform the following operations: controlling the transceiver to receive an establishment/modification request for a PDU session; selecting a user plane function network element for the PDU session; and controlling the transceiver to send an N4 session establishment/modification request to the user plane function network element, where the N4 session establishment/modification request is used to request the user plane function network element to allocate a virtual port identifier to the PDU session.

Based on a same concept, for a problem-resolving principle and beneficial effects of the session management network element, refer to the method and beneficial effects brought by the method according to any one of the fifth aspect to the seventh aspect. Therefore, for implementation of the apparatus, refer to the implementation of the method. Repeated parts are not described again.

A ninth aspect of the embodiments of this application provides a computer-readable storage medium. The computer-readable storage medium stores an instruction, and when the instruction is run on a computer, the computer is enabled to perform the method according to any one of the fifth aspect to the seventh aspect.

A tenth aspect of the embodiments of this application provides a computer program product including an instruction. When the computer program product runs on a computer, the computer is enabled to perform the method according to any one of the fifth aspect to the seventh aspect.

BRIEF DESCRIPTION OF DRAWINGS

To describe the technical solutions in the embodiments of this application or in the background more clearly, the following briefly describes the accompanying drawings for describing the embodiments of this application or the background.

DESCRIPTION OF EMBODIMENTS

Figure 1:
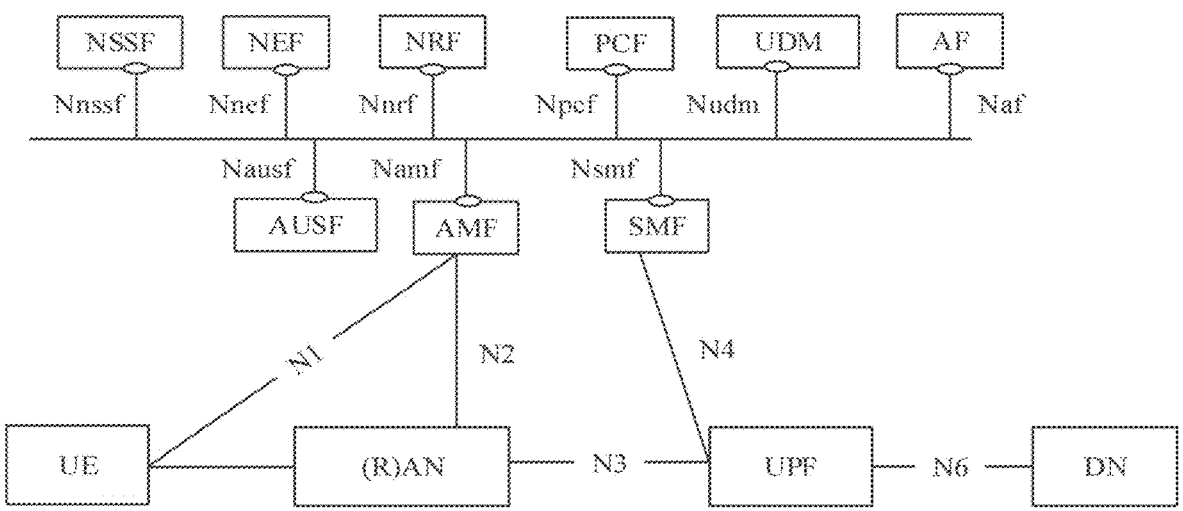
FIG. 1 is a schematic diagram of a network architecture of a 5G system.

The following describes the technical solutions in the embodiments of this application with reference to the accompanying drawings in the embodiments of this application. In descriptions of this application, unless otherwise specified, "/" represents an "or" relationship between associated objects. For example, A/B may represent A or B. In this application, "and/or" merely describes an association relationship between associated objects and represents that three relationships may exist. For example, A and/or B may represent the following three cases: Only A exists, both A and B exist, and only B exists, where A and B may be in a singular or plural form. In addition, in the descriptions of this application, unless otherwise specified, "a plurality of" means two or more than two. "At least one of the following items (pieces)" or a similar expression thereof means any combination of the items, and includes any combination of one item (piece) or a plurality of items (pieces). For example, at least one (piece) of a, b, or c may represent: a, b, c, a-b, a-c, b-c, or a-b-c, where a, b, and c may be in a singular or plural form. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and that the terms such as "first" and "second" do not indicate a definite difference.

In addition, a network architecture and a service scenario described in the embodiments of this application are intended to describe the technical solutions in the embodiments of this application more clearly, and constitute no limitation on the technical solutions provided in the embodiments of this application. A person of ordinary skill in the art may learn that, with the evolution of the network architecture and the emergence of new service scenarios, the technical solutions provided in the embodiments of this application are also applicable to similar technical problems.

A user terminal in the embodiments of this application may include various handheld devices, vehicle-mounted devices, wearable devices, or computing devices that have a wireless communication function, or other processing devices connected to a wireless modem; or may include a UE, a subscriber unit, a cellular phone, a smartphone, a wireless data card, a personal digital assistant (PDA) computer, a tablet computer, a wireless modem (modem), a handheld device, a laptop computer, a cordless phone, a wireless local loop (WLL) station, a machine type communication (MTC) terminal, a mobile station (MS), a terminal device, relay user equipment, or the like. The relay user equipment may be, for example, a 5G residential gateway (RG). For ease of description, in the embodiments of this application, the devices mentioned above are collectively referred to as user terminals, and an example in which the user terminal is a UE is used for description.

FIG. 1 is a schematic diagram of a network architecture of a 5G system. The network architecture includes a UE, an access network (AN) device, and a core network element.

The access network device may alternatively be a radio access network (RAN) device.

The core network element may include these network elements: a UPF, a data network (DN), an authentication server function (AUSF), an access and mobility management function (AMF), a session management function (SMF), a network slice selection function (NSSF), a network exposure function (NEF), a network repository function (NRF), a policy control function (PCF), unified data management (UDM), and an AF.

The core network element may be divided into a control plane network element and a user plane network element. The user plane network element is a UPF network element, and is mainly responsible for forwarding a data packet, controlling quality of service (QoS), collecting statistics about charging information, and the like. The control plane network element is mainly responsible for service procedure interaction, and delivering a data packet forwarding policy, a QoS control policy, and the like to a user plane. The control plane network element in the embodiments of this application mainly includes these network elements: an AMF, an SMF, a PCF, an AF, and an NEF.

The AMF network element is mainly responsible for user access and mobility management. The SMF network element is responsible for managing establishment, deletion, and the like of a PDU session of a user, and maintaining a PDU session context and user plane forwarding pipeline information. The PCF network element is configured to generate and manage user, session, and QoS flow processing policies. The AF network element is a network function element configured to provide various business services, can interact with a core network through the NEF network element, and can interact with a policy management framework to perform policy management. The NEF network element is configured to: provide a framework, authentication, and an interface related to network capability exposure, and transmit information between a network function of the 5G system and another network function.

Communications interfaces between the network elements are further marked in the network architecture shown in FIG. 1. The communications interfaces in the embodiments of this application include: N1, which is a communications interface between the UE and the core network control plane AMF network element and is configured to transmit non-access stratum (NAS) signaling; N2, which is a communications interface between the access network device and the AMF network element; N3, which is a communications interface between the access network device and the core network UPF network element and is configured to transmit user data; and N4, which is a communications interface between the core network control plane SMF network element and the UPF network element and is configured to perform policy configuration and the like on the UPF network element.

A session management network element in the embodiments of this application may be the SMF network element, or may be a network element that is in a future communications system and that has a same function as the SMF network element. A user plane function network element may be the UPF network element, or may be a network element that is in a future communications system and that has a same function as the UPF network element. An application function network element may be the AF network element, or may be a network element that has a same function as the AF network element.

Figure 2:
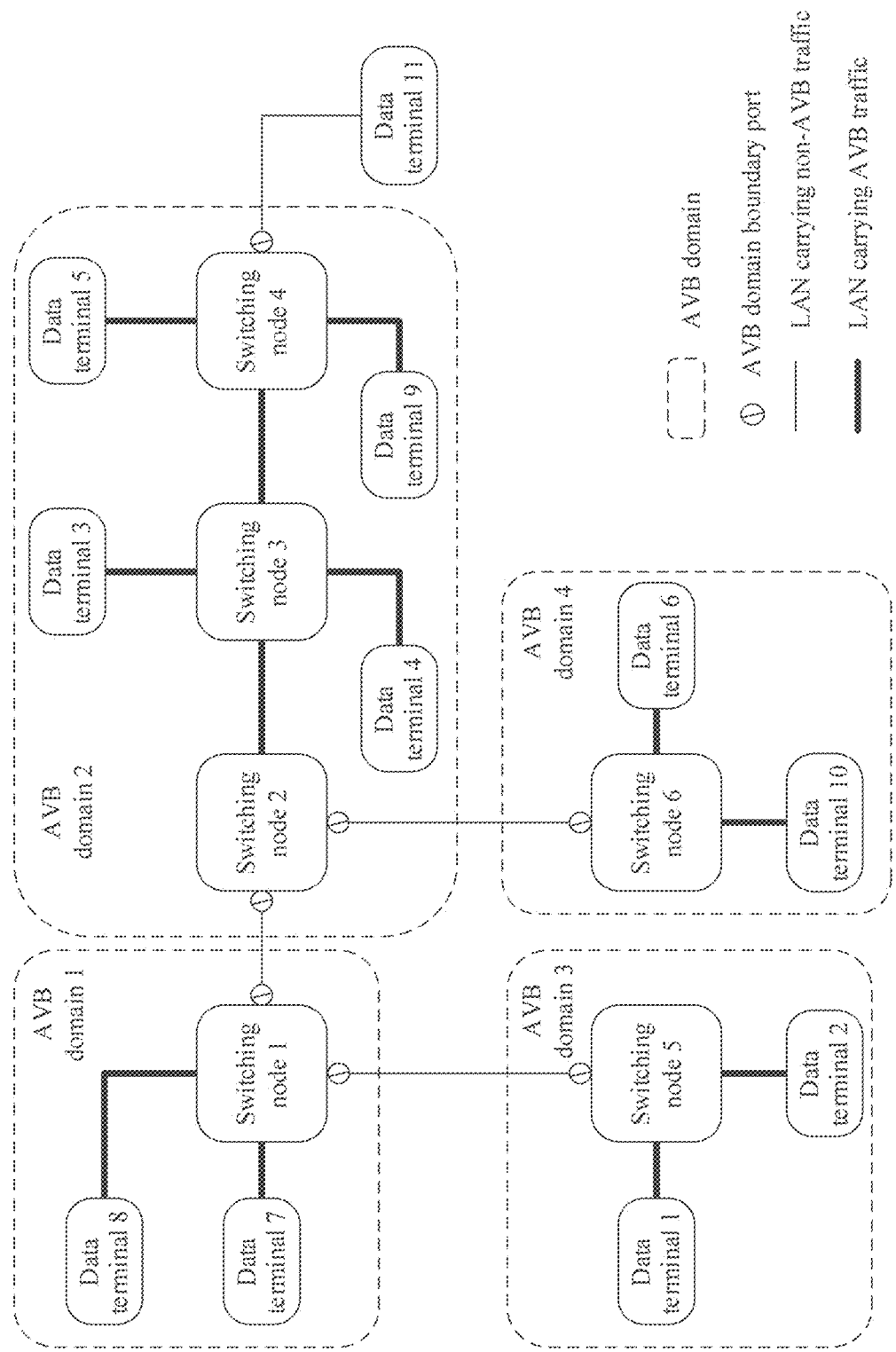
FIG. 2 is a schematic diagram of a network topology of a TSN.

FIG. 2 is a schematic structural diagram of a network topology of a TSN. In the network topology, four audio video bridging (AVB) domains are used as an example. AVB may also be referred to as TSN, and the AVB domain shown in FIG. 2 is also referred to as a TSN domain.

The TSN is based on layer 2 transmission and includes a switching node and a data terminal. A difference from layer 2 switching at a link layer is as follows: The layer 2 switching at the link layer is to perform forwarding based on a media access control (MAC) address, and a switching device obtains a forwarding port by looking up a MAC address learning table. However, the switching node in the TSN does not forward a packet based on a MAC address learning table, but forwards the packet according to a forwarding rule configured or created on the switching node. The TSN standard defines behavior of the data terminal and the switching node and a scheduling manner in which the switching node forwards a data flow, to implement reliable delay transmission. The switching node in the TSN uses a destination MAC address or another feature of the packet as an identifier of the data flow, and performs resource reservation and scheduling planning based on a delay requirement of a service flow, to ensure reliability and a specific transmission delay according to a generated scheduling policy.

Data terminals are a transmitter and a receiver of a TSN stream. For example, the transmitter of the TSN stream may be referred to as a transmit end (talker), and the receiver of the TSN stream may be referred to as a receive end (listener). An AVB domain boundary port is a port that is in an AVB domain and that is connected to a switching node or a data terminal in another AVB domain. For example, there are two AVB domain boundary ports in an AVB domain 1, one port is connected to a switching node 2 in an AVB domain 2, and the other port is connected to a switching node 5 in an AVB domain 3. The TSN stream does not flow into the AVB domain boundary port. It may be understood that the TSN stream flows only through the switching node and the data terminal in the AVB domain. Therefore, a local area network (LAN) carries non-AVB traffic between AVB domain boundary ports, and a LAN carries AVB traffic in one AVB domain.

Figure 3:
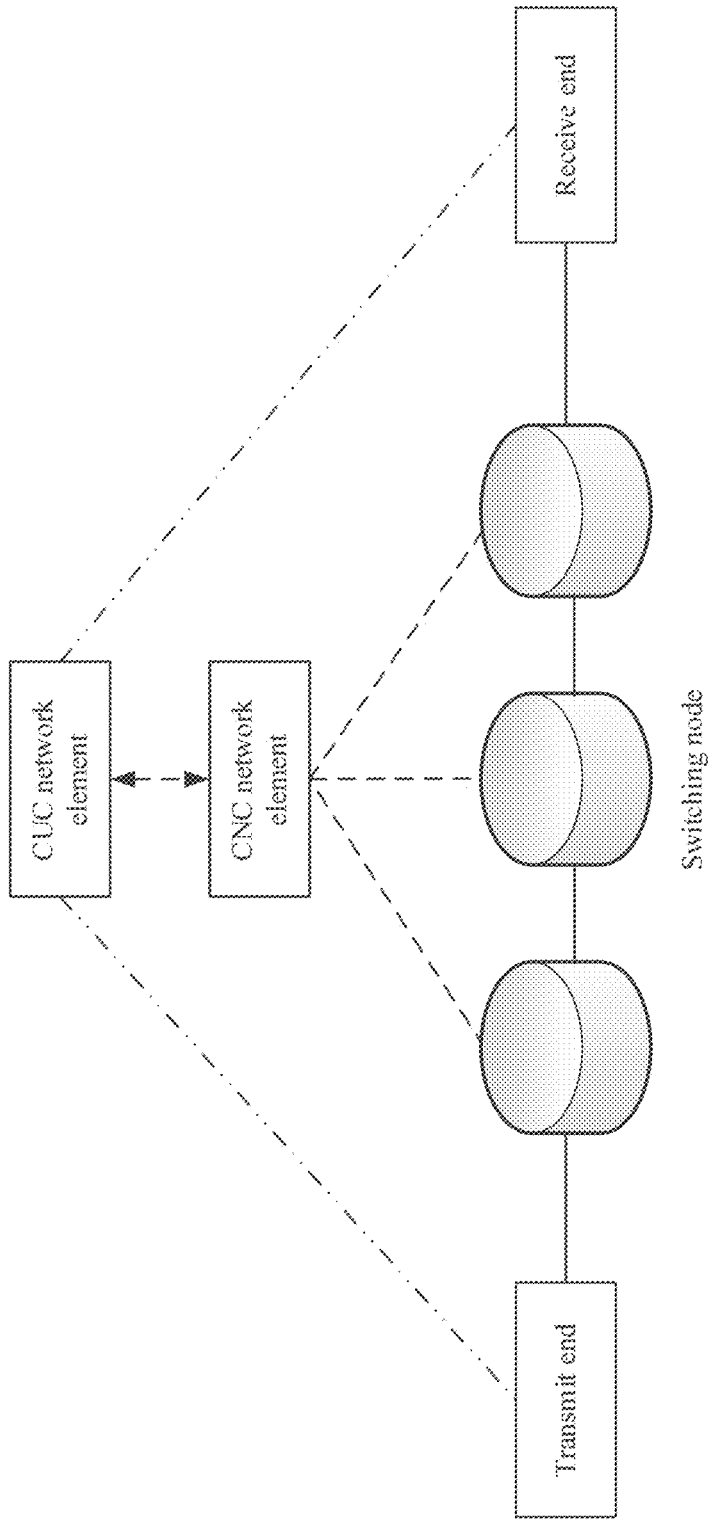
FIG. 3 is a schematic diagram of a centralized management architecture in a TSN.

FIG. 3 is a schematic diagram of a centralized management architecture in a TSN. The centralized management architecture is one of three architectures defined in 802.1qcc in the TSN standard. The centralized management architecture includes a transmit end, a receive end, a switching node, a centralized network configuration (CNC) network element, and a centralized user configuration (CUC) network element. It should be noted that a quantity of network elements and a form of the network element shown in FIG. 3 constitute no limitation on the embodiments of this application. For example, one transmit end and a plurality of receive ends are included. For another example, one switching node or three switching nodes are included.

The switching node reserves a resource for a data flow according to a definition in the TSN standard, and schedules and forwards a data packet.

The CNC network element is responsible for managing a topology of a TSN user plane and capability information of the switching node, generating a data flow forwarding path and processing policies on a data terminal and each switching node based on a data flow creation request provided by the CUC network element, and delivering the processing policy on the switching node to a corresponding switching node. The capability information of the switching node may include, for example, a sending delay of the switching node and an internal processing delay between ports of the switching node. The sending delay is a period of time between a moment at which a packet is sent from a port of the switching node and a moment at which the packet arrives at a port of a peer switching node. The internal processing delay is a period of time between a moment at which a packet arrives at a port of the switching node and a moment at which the packet is sent from another port of the switching node. The processing policy on the switching node may include, for example, a port and a time slice for receiving and sending a packet. The time slice is time information of receiving and sending the packet by the switching node. For example, the packet is received within a period of time from t1 to t2.

The CUC network element is configured to: collect a flow creation request of the data terminal, and after performing matching on a request of the transmit end and a request of the receive end, request the CNC network element to create a flow, and confirm the processing policy generated by the CNC network element. The performing matching on a request of the transmit end and a request of the receive end means the following: The transmit end and the receive end each send a flow creation request to the CUC network element, where the flow creation request includes some information, for example, a destination MAC address of a requested flow. The CUC network element performs matching on the flow creation request and a destination MAC address of a flow requested by a different data terminal. If destination MAC addresses of flows requested by two data terminals are the same, the flows requested by the two data terminals are the same, the matching succeeds, and the flow can be created. Otherwise, only the flow creation request of the transmit end or the receive end is available, the flow cannot be created.

It may be understood that the CNC network element and the CUC network element are control plane network elements in the TSN.

802.1qbv in the TSN standard defines a scheduling and forwarding manner: A switching node sends a packet in a configured time slice. With reference to the centralized management architecture in the TSN shown in FIG. 3, deterministic end-to-end transmission can be implemented. The CNC network element calculates, based on a sending delay and an internal processing delay of each switching node, a time slice for receiving a packet by each switching node on the data flow forwarding path and a time slice for sending the packet by each switching node on the data flow forwarding path. Therefore, each switching node receives and sends a specified data flow within determined time slices, to ensure that a period of time and a delay of transmitting the data flow on the entire forwarding path are determined. An example of the time slice for receiving the packet and the time slice for sending the packet is as follows: A port 1 of a switching node receives a packet within a period of time from t1 to t2, and the received packet is sent from a port 2 within a period of time from t3 to t4. To implement this forwarding mechanism, a switching node in the TSN needs to support functions and corresponding capabilities shown in Table 1.

TABLE 1

| Function | Capability requirement |
|---|---|
| Topology discovery | Have a switching node identifier and a port identifier, and support a protocol such as the link layer discovery protocol (LLDP) |

TABLE 1-continued

| Function | Capability requirement |
| --- | --- |
| Port transmission delay | Detect and report a sending delay |
| Internal processing delay | Determine a range of the internal processing delay |
| Report topology and delay information | Support an interface, defined in the TSN, for interaction with the CNC network element |

To implement deterministic end-to-end transmission in a 5th generation (5G) mobile communications system, an assumption that the 5G system may be virtualized as the switching node in the TSN and implement a function of the switching node in the TSN is proposed. For example, refer to a schematic diagram of a network architecture shown in FIG. 4A. A control plane of a TSN adaptation function is added to an AF network element, a user plane (UP) 1 of the TSN adaptation function is added to a UPF network element, and a UP 2 of the TSN adaptation function is added to a UE. The AF network element, the UPF network element, the UE, and the 5G system jointly constitute a logical switching node, namely, a virtual switching node, which serves as the switching node in the TSN. Although the UPF and the UP 1, and the UE and the UP 2 are separately drawn in FIG. 4A, actually, the UP 1 and the UP 2 are logical functions of the user plane of the TSN adaptation function, and the UP 1 may be deployed on the UPF network element, or the UP 1 may be an internal function module of the UPF network element. Similarly, the UP 2 may be deployed on the UE, or the UP 2 may be an internal function module of the UE.

The TSN adaptation function refers to converting a feature and information of a 5G network into information required in the TSN, and communicating with a network element in the TSN through an interface defined in the TSN.

The AF network element interacts with a CNC network element in the TSN, and provides information about a logical switching node for the CNC network element based on a requirement of a TSN switching node. The user plane of the TSN adaptation function provides necessary information for the control plane of the TSN adaptation function. In other words, the UP 1 may provide necessary information for the AF network element, for example, information about a switching node in the TSN.

Figure 4A:
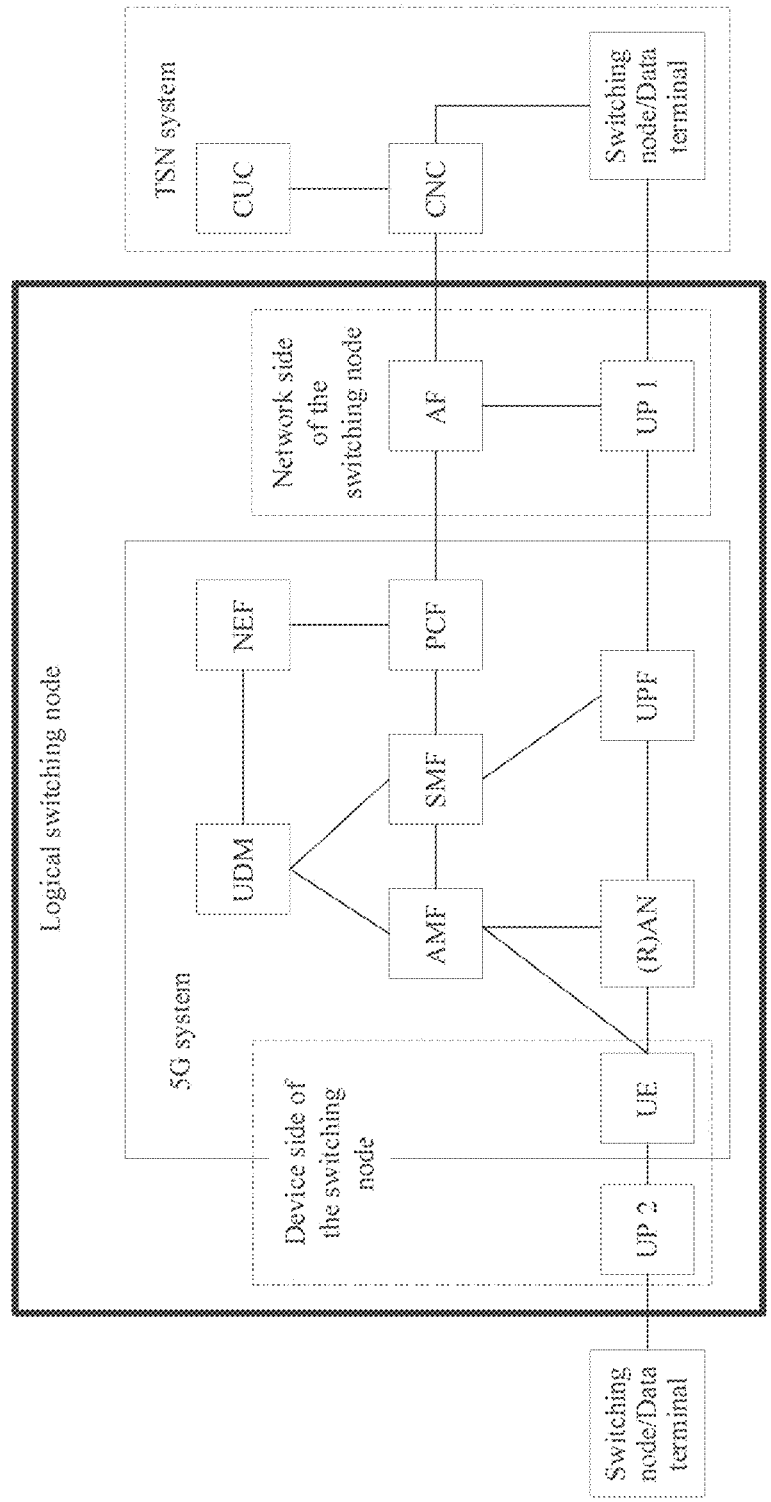
FIG. 4A is a schematic diagram of a network architecture in which a 5G system is virtualized as a switching node in a TSN.

Although the schematic diagram of the network architecture shown in FIG. 4A is proposed, how to specifically implement deterministic transmission in the 5G system is not proposed. Therefore, how to implement deterministic transmission in the 5G system is an urgent technical problem to be resolved.

In view of this, the embodiments of this application provide a time-sensitive networking communication method and an apparatus. A 5G system is virtualized as a switching node in a TSN, attribute information of a virtual switching node is obtained, and the TSN is requested to register the virtual switching node based on the attribute information, to implement deterministic transmission in the 5G system.

Figure 4B:
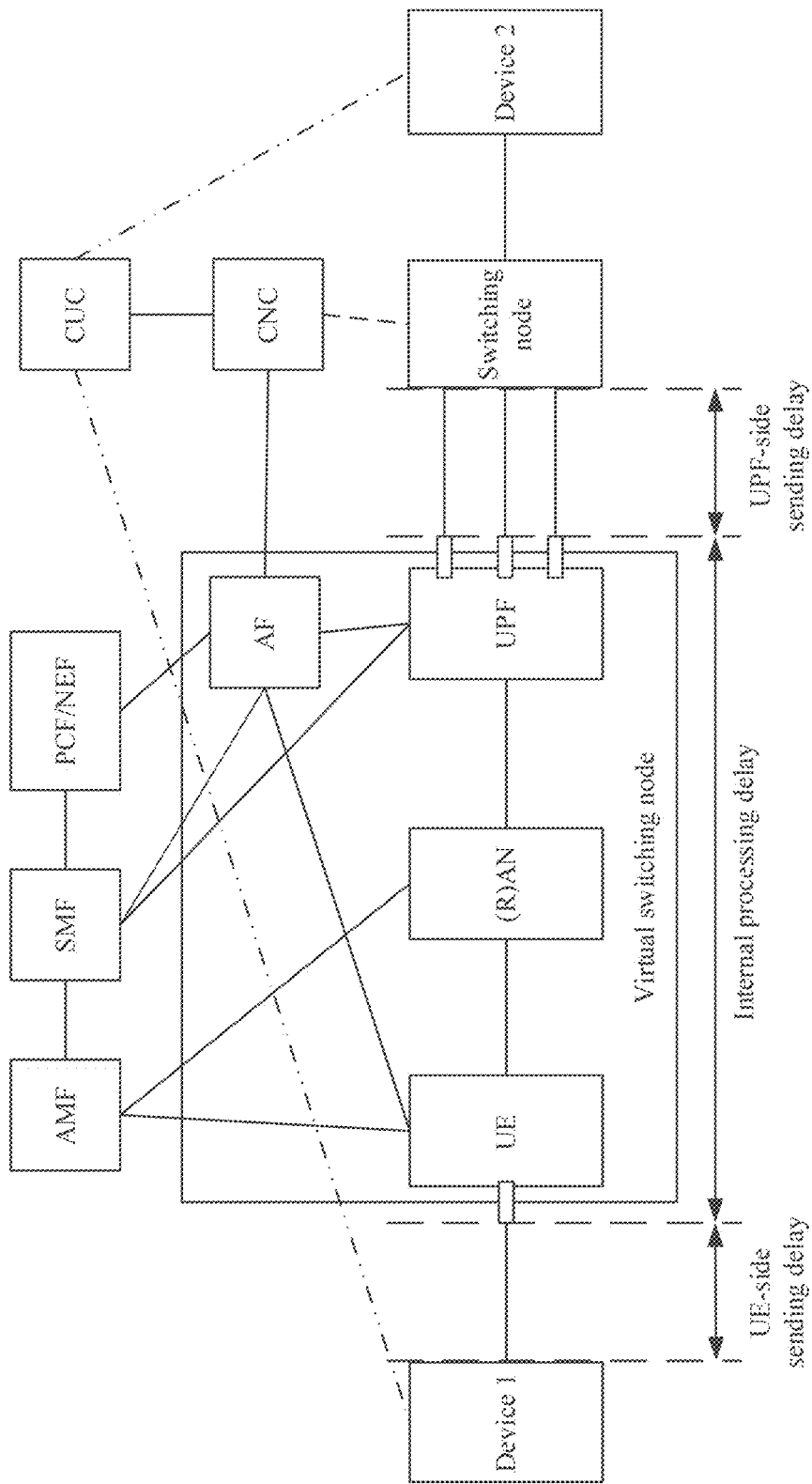
FIG. 4B is a schematic diagram of a network architecture to which an embodiment of this application is applied.

FIG. 4B is a schematic diagram of a network architecture to which an embodiment of this application is applied. In FIG. 4B, a 5G system is virtualized as a switching node in a TSN. Ports of the virtual switching node include a UE-side virtual port and a UPF-side port. The virtual switching node includes UE, an (R)AN, a UPF network element, and an AF network element.

In this embodiment of this application, the UE-side virtual port included in the virtual switching node may be at a granularity of UE. To be more specific, one UE corresponds to one virtual port, and different UEs correspond to different virtual ports. Alternatively, the UE-side virtual port included in the virtual switching node may be at a granularity of a PDU session. To be more specific, one PDU session corresponds to one virtual port, and different PDU sessions correspond to different virtual ports. Alternatively, the UE-side virtual port included in the virtual switching node may be at a granularity of a TSN domain. To be more specific, one TSN domain corresponds to one or more virtual ports, and one virtual port cannot correspond to different TSN domains. The UE-side virtual port may alternatively be a UE-side physical port, and may include one or more UE-side physical ports. Therefore, one UE may include one or more virtual ports. FIG. 4B shows one virtual port of UE, but this constitutes no limitation on the embodiments of this application. In actual application, there may be a plurality of UEs. If the UE-side virtual port included in the virtual switching node is at the granularity of UE, the virtual switching node may include a plurality of UE-side virtual ports.

In the embodiments of this application, the UPF-side port included in the virtual switching node is a physical port that actually exists on the UPF network element. One UPF network element may include a plurality of physical ports, and one physical port of the UPF network element corresponds to one virtual switching node. However, one virtual switching node may include a plurality of physical ports of one UPF network element, or may include a plurality of physical ports of a plurality of UPF network elements. The virtual switching node shown in FIG. 4B includes one UPF network element. The UPF network element includes three physical ports. The three physical ports correspond to a same virtual switching node, but this constitutes no limitation on the embodiments of this application. In actual application, one virtual switching node includes more than one UPF network element. In this case, UPF-side ports included in the virtual switching node include physical ports of more than one UPF network element.

For ease of differentiation, in the embodiments of this application, the UE-side virtual port of the virtual switching node is referred to as a virtual port of the virtual switching node, the UPF-side port of the virtual switching node is referred to as a physical port of the virtual switching node, and a UPF-side port is referred to as a physical port of a UPF for description.

In FIG. 4B, a user plane of a TSN adaptation function is deployed on the UE or a user plane of a TSN adaptation function is an internal function module of the UE, namely, the UP 2 in FIG. 4A. The UP 2 is configured to: obtain attribute information of the UE-side virtual port; and send the attribute information to the AF network element through a user plane or a control plane. The attribute information of the virtual port may include external topology information corresponding to the virtual port and an external transmission delay (namely, a UE-side sending delay) of the virtual port. Similarly, a user plane of the TSN adaptation function is deployed on the UPF or a user plane of the TSN adaptation function is an internal function module of the UPF, namely, the UP 1 in FIG. 4A. The UP 1 is configured to: obtain attribute information of the UPF-side physical port; and send the attribute information to the AF network element through a user plane or a control plane. Additionally, the UP 1 may further exchange user plane—related information and TSN parameter—related information with the AF network element. The attribute information of the physical port may include external topology information corresponding to the physical port and an external transmission delay (namely, a UPF-side sending delay) of the physical port.

In FIG. 4B, the AF network element is a logical network element, and may be a component in another logical network element (for example, a component in an SMF network element), or may be another control plane function network element. A name of the AF network element is not limited herein.

In FIG. 4B, a processing delay between the UE-side virtual port and the UPF-side physical port is referred to as an internal processing delay. The internal processing delay is specific to a port pair, and different port pairs may have different internal processing delays, for example, an internal processing delay 1 between a virtual port 1 and a physical port 1 may be different from an internal processing delay 2 between the virtual port 1 and a physical port 2. Values of the internal processing delay 1 and the internal processing delay 2 may be different.

In FIG. 4B, a device 1 and a device 2 may be equivalent to the data terminals in FIG. 2, or may be equivalent to the transmit end or the receive end in FIG. 3. The device 1 is connected to the UE-side virtual port, and the connection may be a physical link, or may be a virtual connection (for example, the device 1 is a processing unit of a device in which the UE is located). The device 1 may be a terminal device other than the UE, or may be a switching node. The device 1 shown in FIG. 4B is used as a terminal device to interact with a CUC network element. If the device 1 is a switching node, the device 1 interacts with a CNC network element (the device 1 is similar to a switching node that is connected to the UPF network element and that is shown in FIG. 4B). The device 2 shown in FIG. 4B is used as a terminal device to interact with the CUC network element. The device 2 is not directly connected to a physical port of the UPF network element. There is one switching node between the device 2 and the virtual switching node. The switching node may be a switching node that actually exists in the TSN, for example, a switching node on a data network (DN) or another virtual switching node. Alternatively, the device 2 may be directly connected to the physical port of the UPF network element.

The following describes the time-sensitive networking communication method provided in the embodiments of this application. In descriptions of the time-sensitive networking communication method, an example in which a user terminal is a UE, an access management network element is an AMF network element, a session management network element is an SMF network element, a user plane function network element is a UPF network element, and an application function network element is an AF network element is used for description. For ease of description, figures corresponding to the embodiments do not show the two words "network element", and the two words "network element" are not used in descriptions of the embodiments. However, this does not affect understanding of the embodiments of this application.

It should be noted that in the following embodiments of this application, names of messages between network elements, names of parameters in messages, or the like are merely examples, and there may be other names in other implementations. This is not specifically limited in the embodiments of this application.

Figure 5:
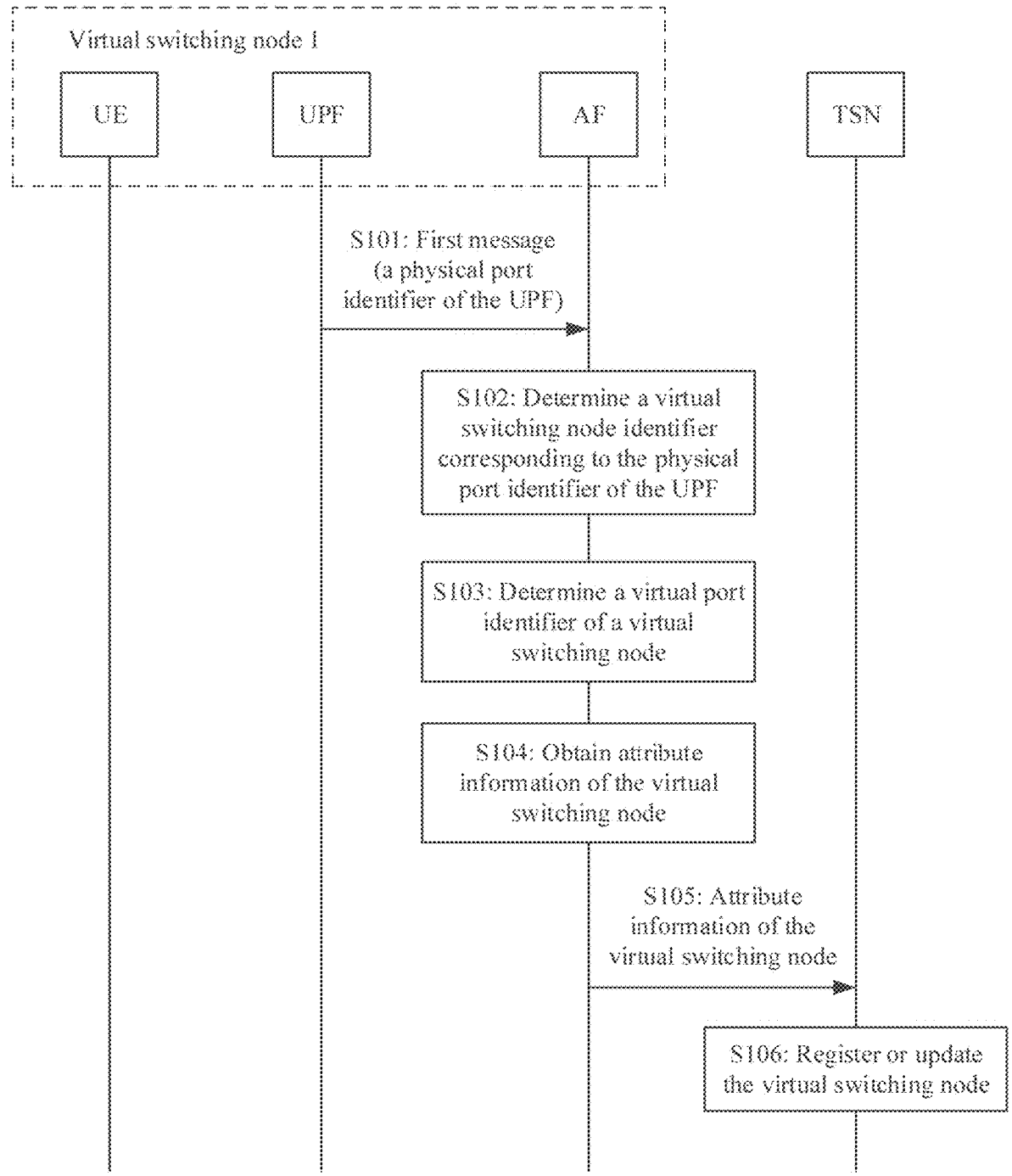
FIG. 5 is a schematic flowchart of a time-sensitive networking communication method according to Embodiment 1 of this application.

An example in which an embodiment of this application is applied to the schematic diagram of the network architecture shown in FIG. 4B is used. FIG. 5 is a schematic flowchart of a time-sensitive networking communication method according to Embodiment 1 of this application. The embodiment shown in FIG. 5 may include but is not limited to the following steps.

Step S101: A UPF sends a first message to an AF, where the first message includes a physical port identifier of the UPF. Correspondingly, the AF receives the first message from the UPF.

The first message may include a plurality of physical port identifiers of the UPF, and one physical port corresponds to one physical port identifier. The physical port identifier may be sent by the UPF to the AF when the UPF is started or performs configuration or in a process in which a UE establishes a PDU session, or may be sent by the UPF to the AF together with other information in a subsequent step.

In a first possible implementation, when the UPF is started or performs configuration, the UPF may directly send, to the AF, the first message that carries the physical port identifier. In a second possible implementation, when the UPF is started or performs configuration, the UPF may send, to an SMF, the first message that carries the physical port identifier, and then the SMF sends the first message to the AF directly or through a PCF and/or an NEF. In a third possible implementation, in the process in which the UE establishes the PDU session, the UPF sends, to an SMF through an N4 interface of the PDU session, the first message that carries the physical port identifier, and then the SMF sends the first message to the AF directly or through a PCF and/or an NEF.

Optionally, the first message further includes a virtual switching node identifier, and the virtual switching node identifier is an identifier of a virtual switching node corresponding to the physical port identifier of the UPF. A virtual switching node corresponding to a physical port of the UPF is a switching node as which a 5G system in which the physical port of the UPF is located is virtualized. If a switching node as which the physical port of the UPF, the UE, and the AF are virtualized is a virtual switching node 1, the virtual switching node identifier is 1. In this embodiment of this application, an example in which a virtual switching node identifier corresponding to the physical port of the UPF is the virtual switching node identifier 1 is used for description.

The following implementation method is included but is not limited thereto: If the UPF includes a plurality of physical port identifiers, the first message includes a correspondence between a physical port identifier and a virtual switching node identifier. The correspondence may be a one-to-one correspondence. In other words, one physical port identifier corresponds to one virtual switching node identifier. Alternatively, the correspondence may be a many-to-one correspondence. In other words, two or more physical port identifiers correspond to one virtual switching node identifier. The physical port identifier and the virtual switching node identifier corresponding to the physical port identifier may be configured on the UPF. In this case, the first message may include the physical port identifier and the virtual switching node identifier corresponding to the physical port identifier. If the virtual switching node identifier corresponding to the physical port identifier is not configured on the UPF, the first message does not carry the virtual switching node identifier.

The first message is used to request the AF to create a virtual switching node or add a physical port to a virtual switching node. If the AF has not created a virtual switching node corresponding to the virtual switching node identifier, the AF creates the virtual switching node based on the first message. Optionally, the AF adds, to the virtual switching node, a physical port corresponding to the physical port identifier. If the AF has created a virtual switching node corresponding to the virtual switching node identifier, the AF adds, to the virtual switching node based on the first message, a physical port corresponding to the physical port identifier.

If the first message carries the virtual switching node identifier, the AF may directly create the virtual switching node using the virtual switching node identifier carried in the first message. If the first message does not carry the virtual switching node identifier, the AF allocates a virtual switching node identifier to the virtual switching node when creating the virtual switching node. Optionally, the AF notifies the UPF of the allocated virtual switching node identifier.

Optionally, the first message further includes a TSN identifier corresponding to the physical port identifier. The TSN identifier may be a virtual local area network (VLAN) identifier, where the virtual local area network identifier is used to identify a VLAN to which the physical port belongs. Alternatively, the first message may further include class of service (CoS) information, where the class of service information is used to identify a class of service to which the physical port belongs. Alternatively, the first message may further include a VLAN identifier and CoS information, where the VLAN identifier and the CoS information are used to identify a VLAN and a class of service to which the physical port belongs. The TSN identifier is used to identify a TSN domain to which a UPF-side physical port belongs, and the TSN domain may be indicated by at least one of the VLAN identifier or the CoS information. The TSN identifier corresponding to the physical port identifier may be further configured on the UPF, such that the UPF sends the TSN identifier corresponding to the physical port identifier to the AF.

Optionally, the first message further includes an identifier of the UPF, where the identifier of the UPF is used to distinguish between UPFs.

Any UPF in the 5G system may report a physical port identifier of the UPF to the AF in advance, such that the AF establishes and maintains a correspondence between each UPF and a physical port identifier of the UPF. If the first message further includes the virtual switching node identifier, the AF may establish and maintain a correspondence between each UPF, a physical port identifier of the UPF, and a virtual switching node identifier. If the first message further includes the TSN identifier corresponding to the physical port, the AF may establish and maintain a correspondence between each UPF, a physical port identifier of the UPF, a virtual switching node identifier, and a corresponding TSN identifier. Even if the UPF does not include the virtual switching node identifier in the first message, when the AF creates the virtual switching node for the UPF, the AF allocates the virtual switching node identifier to the UPF. In this case, the AF may further establish and maintain a correspondence between the UPF, the physical port identifier of the UPF, and the virtual switching node identifier.

Step S102: The AF determines the virtual switching node identifier corresponding to the physical port identifier of the UPF.

The AF may determine, in the following three manners, the virtual switching node identifier corresponding to the physical port identifier of the UPF.

Manner 1: The UPF reports, to the AF through the first message, the physical port identifier and the virtual switching node identifier corresponding to the physical port identifier that are configured on the UPF. Thus, the AF may directly obtain, from the first message, the physical port identifier of the UPF and the virtual switching node identifier corresponding to the physical port identifier.

Manner 2: The UPF reports, to the AF through the first message, the identifier of the UPF and/or the physical port identifier configured on the UPF. Then the AF creates a virtual switching node for the UPF and/or the physical port identifier of the UPF, and allocates a virtual switching node identifier to the created virtual switching node.

Manner 3: A correspondence between a virtual switching node identifier, and an identifier of a UPF and/or a physical port identifier of a UPF is configured on the AF. When receiving, from the UPF, the first message that carries the identifier of the UPF and/or the physical port identifier of the UPF, the AF searches the configured correspondence for a virtual switching node identifier corresponding to the identifier of the UPF and/or the physical port identifier of the UPF that are/is carried in the first message.

After determining a virtual switching node identifier corresponding to an identifier of each UPF and/or a physical port identifier of each UPF, the AF may establish and maintain a correspondence between the virtual switching node identifier, and the identifier of each UPF and/or each physical port identifier of each UPF.

It may be understood that steps S101 and S102 are steps performed in advance, and are prerequisites for implementing this embodiment of this application. The UPF in steps S101 and S102 may be any UPF in the 5G system.

Step S103: The AF determines a virtual port identifier of the virtual switching node.

For example, that the AF determines the virtual port identifier of the virtual switching node identified by the virtual switching node identifier is as follows: The AF may allocate the virtual port identifier to the virtual switching node, to determine the virtual port identifier. Alternatively, the AF may receive a message that carries a virtual port identifier and that is sent by the SMF or the UPF, and determine whether a virtual switching node corresponding to the virtual port identifier is the same as the virtual switching node determined in step S102. If the virtual switching node corresponding to the virtual port identifier is the same as the virtual switching node determined in step S102, the AF may determine the virtual port identifier as the virtual port identifier of the virtual switching node.

The AF may determine a virtual port identifier of each virtual switching node, or may determine a virtual port identifier of a specified virtual switching node, for example, determine a virtual port identifier of a virtual switching node corresponding to a PDU session. There may be one or more virtual port identifiers of the virtual switching node that are determined by the AF.

Optionally, when determining the virtual port identifier of the virtual switching node, the AF may establish a port pair relationship between a physical port identifier and the virtual port identifier of the virtual switching node, and may establish the port pair relationship according to a requirement or a specific rule. A specific manner of establishing the port pair relationship is not limited in the embodiments of this application. The AF may establish the port pair relationship in a process of establishing a PDU session, or may establish the port pair relationship when a flow is created. For example, the virtual switching node includes a physical port identifier 1 and a physical port identifier 2, and the AF allocates a virtual port identifier a and a virtual port identifier b to the virtual switching node. The AF may establish a port pair relationship between the physical port identifier 1 and the virtual port identifier a. To be more specific, a flow flows in through a physical port identified by the physical port identifier 1, and flows out through a virtual port identified by the virtual port identifier a; or flows in through a virtual port identified by the virtual port identifier a, and flows out through a physical port identified by the physical port identifier 1. It should be noted that one or more port pair relationships may be established between one virtual port and one or more physical ports, and one or more port pair relationships may be established between one physical port and one or more virtual ports. One port pair relationship may be used to transmit one flow.

Step S103 may be performed in a process in which the UE establishes a PDU session, or may be performed in a process of creating a flow, or may be performed in another process. In this embodiment of this application, an example in which step S103 is performed in a process of establishing a PDU session is used for description. For details, refer to subsequent embodiments shown in FIG. 6A and FIG. 6B to FIG. 8A and FIG. 8B.

A subsequent step may be performed in a process of establishing a PDU session, and a specific step or specific steps in which the subsequent step is performed constitutes or constitute no limitation on the embodiments of this application. The subsequent step may alternatively be performed in a process of modifying a PDU session, especially when a modified PDU session and the PDU session before the modification are associated with different UPFs.

Step S104: The AF obtains attribute information of the virtual switching node.

The attribute information of the virtual switching node includes attribute information of a physical port identified by the physical port identifier and attribute information of a virtual port identified by the virtual port identifier. The attribute information of the physical port may include the physical port identifier, external topology information of the physical port, and an external delay of the physical port. The attribute information of the virtual port may include the virtual port identifier, external topology information of the virtual port, and an external delay of the virtual port.

A method for obtaining the external topology information of the physical port and the external topology information of the virtual port is not limited in the embodiments of this application.

The external delay of the physical port, namely, the UPF-side sending delay shown in FIG. 4B, may be measured and reported by the UPF to the AF, or may be measured and reported by the SMF to the AF. The external delay of the virtual port, namely, the UE-side sending delay shown in FIG. 4B, may be "0" by default, or may be measured and reported by the UE to the AF, or may be measured by the SMF and reported by the UPF or the UE to the AF.

The attribute information of the virtual switching node may further include an internal processing delay between the physical port and the virtual port. The internal processing delay may be a delay between a moment of receiving a data packet through N6 by the UPF and a moment of sending the data packet through a virtual port of the UE, or a delay between a moment of receiving a data packet through N6 by the UPF and a moment of receiving the data packet by a device 1 following the UE (in this case, the UE-side sending delay is "0" by default). The internal processing delay is not limited to being at a granularity of UE or a PDU session.

In a possible implementation, the SMF detects the internal processing delay. In this case, the SMF needs to obtain the virtual port identifier of the virtual switching node. The AF may send a seventh message to the SMF, where the seventh message includes the virtual port identifier allocated in step S103. Optionally, the seventh message further includes the virtual switching node identifier, such that the SMF learns of a specific virtual switching node to which the virtual port identifier belongs. When detecting the internal processing delay, the SMF may actively report the internal processing delay to the AF.

The AF may send an internal processing delay request to the SMF, where the internal processing delay request may carry the virtual port identifier. When receiving the internal processing delay request, the SMF detects or reads the internal processing delay, and sends the internal processing delay to the AF.

Optionally, the seventh message or the internal processing delay request sent by the AF to the SMF may further carry the physical port identifier, that is, carry the virtual port identifier and the physical port identifier of the virtual switching node. As such, the SMF obtains the internal processing delay based on the virtual port identifier and the physical port identifier. When one virtual port uniquely corresponds to one physical port, the physical port identifier may not be carried.

In a possible implementation, the AF sends an internal processing delay request to the UPF, where the internal processing delay request may carry the virtual port identifier. Optionally, the internal processing delay request may carry at least one of the physical port identifier of the UPF or the virtual switching node identifier. When receiving the internal processing delay request, the UPF detects the internal processing delay or requests the SMF to detect the internal processing delay. When obtaining the internal processing delay, the UPF may feed back the internal processing delay to the AF in the following two manners.

Manner 1: The UPF directly sends an internal processing delay response to the AF, where the internal processing delay response includes the internal processing delay and the virtual port identifier, that is, indicates that the internal processing delay is a processing delay between the virtual port and the physical port. Optionally, the internal processing delay response further includes the physical port identifier when the UPF maintains a correspondence between a virtual port and a physical port or when the seventh message indicates a correspondence between a virtual port and a physical port. Optionally, the internal processing delay response further includes the virtual switching node identifier when the UPF maintains a correspondence between a virtual port, a physical port, and a virtual switching node or when the seventh message indicates a correspondence between a virtual port, a physical port, and a virtual switching node.

Manner 2: The UPF sends an internal processing delay response to the AF through the SMF, where the internal processing delay response includes the internal processing delay. Optionally, the UPF sends the internal processing delay response to the SMF through the N4 interface, where the N4 interface can identify a session identifier of a PDU session. If the SMF maintains a correspondence between a PDU session and a virtual port identifier, the SMF may include the virtual port identifier in the internal processing delay response sent to the AF. Optionally, the internal processing delay response further includes the virtual switching node identifier when the SMF maintains a correspondence between a virtual switching node and a virtual port.

In a possible implementation, the AF sends an internal processing delay request to the PCF, where the internal processing delay request may carry the virtual port identifier. When receiving the internal processing delay request, the PCF reads the internal processing delay or requests the SMF to detect the internal processing delay. When obtaining the internal processing delay, the PCF may feed back the internal processing delay to the AF.

Step S105: The AF sends the attribute information of the virtual switching node to a TSN. Correspondingly, the TSN receives the attribute information of the virtual switching node from the AF.

For example, the AF sends the attribute information of the virtual switching node to CNC in the TSN, to request the CNC to register or update the virtual switching node based on the attribute information of the virtual switching node.

Step S106: The TSN registers or updates the virtual switching node.

When receiving the attribute information of the virtual switching node, the CNC in the TSN registers or updates the virtual switching node based on the attribute information of the virtual switching node.

If related information of the virtual switching node does not exist on the CNC, the CNC registers the virtual switching node based on the attribute information of the virtual switching node. If related information of the virtual switching node exists on the CNC, the CNC updates the virtual switching node based on the attribute information of the virtual switching node, for example, updates the virtual port identifier of the virtual switching node.

In Embodiment 1 shown in FIG. 5, the UPF reports, to the AF, the physical port identifier configured by the UPF, and the AF determines the virtual switching node identifier corresponding to the physical port identifier and the virtual port identifier of the virtual switching node identified by the virtual switching node identifier, and obtains the attribute information of the virtual port and the attribute information of the physical port. As such, the AF requests the TSN to register or update the virtual switching node, to implement deterministic transmission in the 5G system.

Figure 6A:
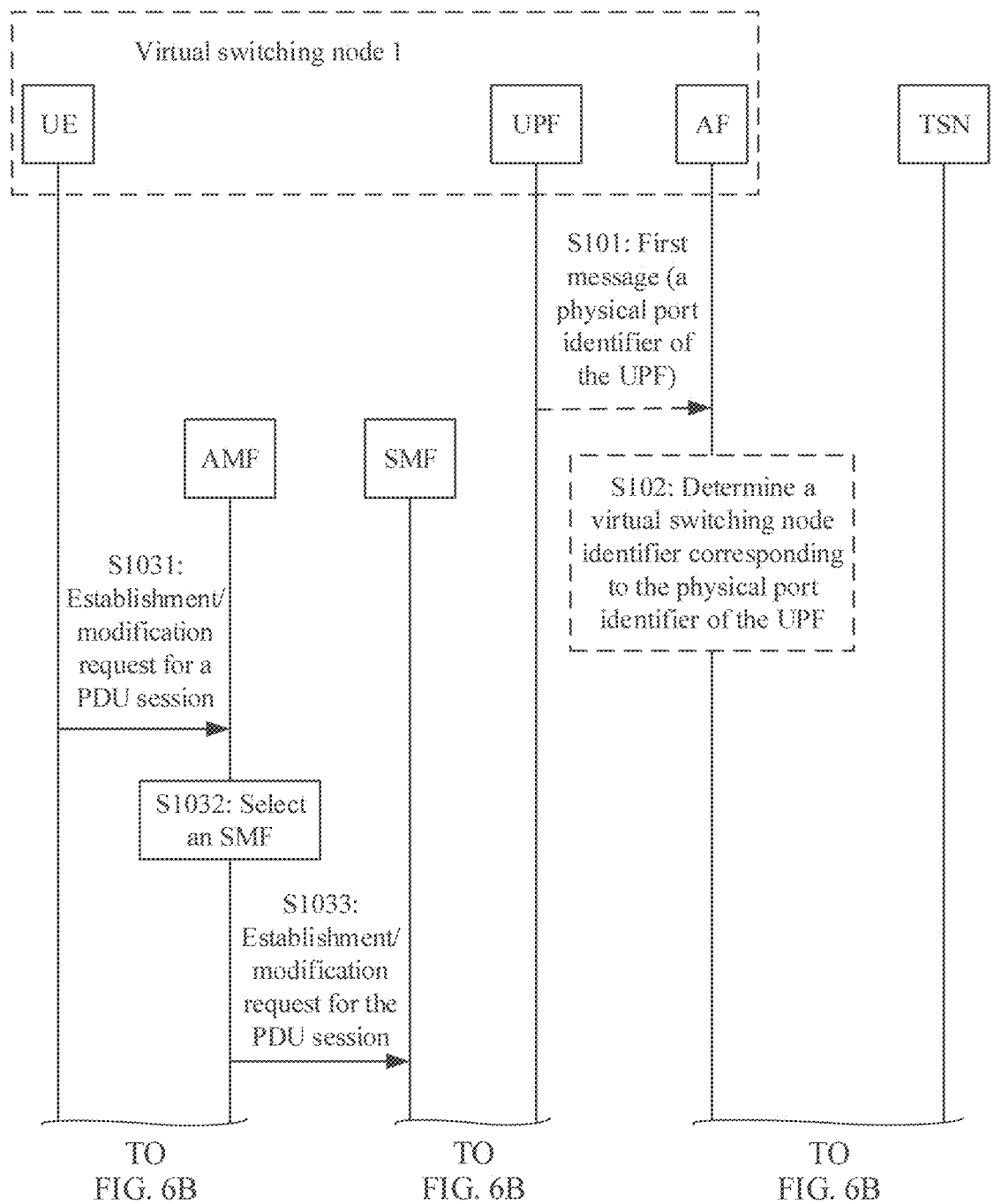
FIG. 6A and FIG. 6B are schematic flowcharts of a time-sensitive networking communication method according to Embodiment 2 of this application.
Figure 6B:
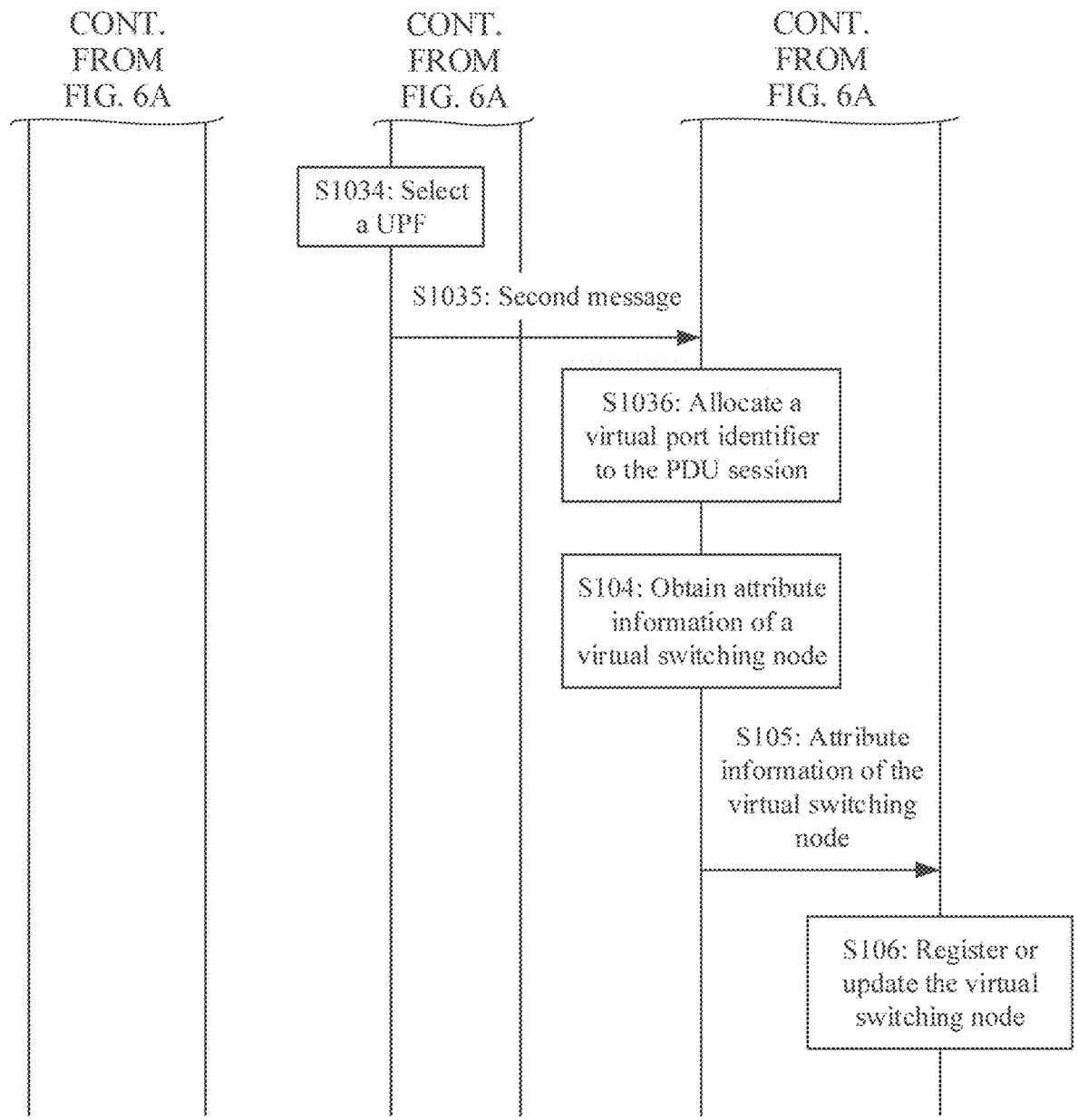

An example in which an embodiment of this application is applied to the schematic diagram of the network architecture shown in FIG. 4B is used. FIG. 6A and FIG. 6B are a schematic flowchart of a time-sensitive networking communication method according to Embodiment 2 of this application. The method is described using an example in which step S103 is performed in a process of establishing a PDU session. In addition, in the method, an AF allocates a virtual port identifier to the PDU session. The method may include the following.

In a process of a UE establishing a PDU session, an SMF selects a UPF for the PDU session, and requests the AF to allocate a virtual port identifier to the PDU session. The AF allocates the virtual port identifier to the PDU session, and the AF obtains attribute information of a virtual switching node, where the attribute information includes attribute information of a physical port and attribute information of a virtual port. Further, the AF sends the attribute information of the virtual switching node to a TSN, such that the TSN registers or updates the virtual switching node.

For example, the embodiment shown in FIG. 6A and FIG. 6B may include but is not limited to the following steps.

Step S101: The UPF sends a first message to the AF, where the first message includes a physical port identifier of the UPF. Correspondingly, the AF receives the first message from the UPF.

Step S102: The AF determines a virtual switching node identifier corresponding to the physical port identifier of the UPF.

When determining the virtual switching node identifier corresponding to the physical port identifier of the UPF, the AF may also determine a virtual switching node identifier corresponding to the UPF.

Step S1031: The UE sends an establishment/modification request for the PDU session to an AMF over an (R)AN. Correspondingly, the AMF receives the establishment/modification request for the PDU session from the UE.

When the UE needs to establish or modify the PDU session, the UE sends the establishment/modification request for the PDU session to the AMF over the (R)AN.

Optionally, the establishment/modification request for the PDU session includes at least one of a TSN identifier or data network name (DNN) information corresponding to the PDU session. The DNN information is used to indicate that a data network is a deterministic transmission network.

Step S1032: The AMF selects an SMF for the PDU session.

When receiving the establishment/modification request for the PDU session, the AMF selects the SMF for the PDU session. For a method for selecting the SMF for the PDU session by the AMF, refer to other approaches. Details are not described herein.

Step S1033: The AMF sends the establishment/modification request for the PDU session to the selected SMF. Correspondingly, the SMF receives the establishment/modification request for the PDU session from the AMF.

Step S1034: The SMF selects a UPF for the PDU session.

In a possible implementation, before step S1034 is performed, a step in which the SMF determines whether the PDU session has a deterministic transmission requirement is further performed. When determining that the PDU session has the deterministic transmission requirement, the SMF selects a UPF that supports deterministic transmission.

The SMF may determine, in the following manners, whether the PDU session has the deterministic transmission requirement.

Manner 1: The SMF may obtain, from UDM or a PCF, a transmission delay and a jitter parameter that correspond to the PDU session, and determine, based on the transmission delay and the jitter parameter, whether the PDU session has the deterministic transmission requirement. Optionally, the SMF can determine that the PDU session has the deterministic transmission requirement when the transmission delay and/or the jitter parameter meet/meets the deterministic transmission requirement. The jitter parameter is used as an example. If the jitter parameter corresponding to the PDU session is less than a preset threshold, the SMF may determine that the PDU session has the deterministic transmission requirement. The preset threshold may be set by the SMF, and a specific value of the preset threshold is not limited in the embodiments of this application.

For example, that the SMF obtains, from the UDM, the transmission delay and the jitter parameter that correspond to the PDU session includes the following.

The SMF sends a subscription information request to the UDM. For example, the subscription information request may include the DNN information and an identifier of the UE, and is used to request subscription information of the UE on a data network indicated by the DNN information.

The SMF receives a subscription information response from the UDM, where the subscription information response includes the subscription information of the UE on the data network indicated by the DNN information, and the subscription information may include the transmission delay and the jitter parameter. The SMF may obtain, based on the transmission delay and the jitter parameter that are included in the subscription information, the transmission delay and the jitter parameter that correspond to the PDU session.

For example, that the SMF obtains, from the PCF, the transmission delay and the jitter parameter that correspond to the PDU session includes the following.

The SMF sends a QoS policy request to the PCF. For example, optionally, the QoS policy request may carry a session identifier of the PDU session, and is used to request a QoS policy corresponding to the PDU session, where the QoS policy corresponding to the PDU session may include the transmission delay and the jitter parameter that correspond to the PDU session.

The SMF receives a QoS policy response from the PCF. For example, the QoS policy response may include the transmission delay and the jitter parameter that correspond to the PDU session.

Manner 2: The SMF may obtain, from UDM, a PCF, or the UE, the TSN identifier corresponding to the PDU session, and the SMF may select, based on the TSN identifier, a UPF that supports deterministic transmission and that belongs to a TSN domain identified by the TSN identifier. In other words, the UPF selected by the SMF in this case supports deterministic transmission and belongs to the TSN domain identified by the TSN identifier. The TSN domain identified by the TSN identifier may include one or more UPFs.

For example, that the SMF obtains, from the UDM, the TSN identifier corresponding to the PDU session includes the following.

The SMF sends a subscription information request to the UDM. For example, the subscription information request may include the DNN information and an identifier of the UE, and is used to request subscription information of the UE on a data network indicated by the DNN information.

The SMF receives a subscription information response from the UDM. For example, the subscription information response includes the subscription information of the UE on the data network indicated by the DNN information, and the subscription information may include a TSN identifier. The SMF may use the TSN identifier included in the subscription information as the TSN identifier corresponding to the PDU session.

For example, that the SMF obtains, from the PCF, the TSN identifier corresponding to the PDU session includes the following.

The SMF sends a QoS policy request to the PCF. For example, optionally, the QoS policy request may carry a session identifier or a flow identifier of the PDU session (the flow identifier is an identifier of a flow of the PDU session), and is used to request a QoS policy corresponding to the PDU session/flow, where the QoS policy corresponding to the PDU session/flow may include a TSN identifier corresponding to the PDU session/flow.

The SMF receives a QoS policy response from the PCF. For example, the QoS policy response may include the TSN identifier corresponding to the PDU session/flow, and the TSN identifier is used to identify a TSN domain to which the PDU session belongs.

For example, that the SMF obtains, from the UE, the TSN identifier corresponding to the PDU session includes the following.

The SMF receives the establishment/modification request for the PDU session sent by the UE through the AMF, where the establishment/modification request for the PDU session includes the TSN identifier, and the TSN identifier is used to identify a TSN domain to which the PDU session belongs.

Manner 3: UDM, a PCF, or the UE may explicitly indicate, through information or a bit in information, that the PDU session has the deterministic transmission requirement. In this case, when receiving the information, the SMF may determine that the PDU session has the deterministic transmission requirement. Specific information or a specific bit in specific information through which the UDM, the PCF, or the UE explicitly indicates that the PDU session has the deterministic transmission requirement is not limited in the embodiments of this application.

Manner 4: The SMF may obtain the DNN information from the UE, where the DNN information is used to indicate that the data network is a deterministic transmission network. Then the SMF may determine, based on the DNN information, that the PDU session has the deterministic transmission requirement, such that the SMF selects a UPF for the PDU session from one or more UPFs corresponding to the data network. For example, the establishment/modification request for the PDU session sent by the UE to the SMF through the AMF includes the DNN information, such that the SMF can obtain, from the UE, the DNN information corresponding to the PDU session.

In a possible implementation, the SMF may select a UPF for the PDU session based on an existing process of establishing the PDU session.

Optionally, after selecting the UPF for the PDU session, the SMF may select a physical port, on the UPF, for PDU session transmission, that is, select a physical port used to receive or send a data packet for the PDU session.

When receiving a physical port identifier sent by each UPF, the SMF may establish and maintain a correspondence between each UPF and the physical port identifier of the UPF. If each UPF further sends a virtual switching node identifier corresponding to a physical port to the SMF, the SMF may establish and maintain a correspondence between the virtual switching node identifier, and each UPF and/or the physical port identifier of the UPF.

Step S1035: The SMF sends a second message to the AF, where the second message includes at least one of an identifier of the UPF or the virtual switching node identifier. Correspondingly, the AF receives the second message from the SMF.

The identifier of the UPF carried in the second message is an identifier of the UPF selected by the SMF for the PDU session.

In a possible implementation, the second message includes the identifier of the UPF. Because the AF maintains a correspondence between an identifier of each UPF and a virtual switching node identifier, when the AF receives the second message that carries the identifier of the UPF, the AF may determine a virtual switching node identifier corresponding to the identifier of the UPF, where the virtual switching node identifier is a virtual switching node identifier corresponding to the PDU session. As such, the AF adds a virtual port to a virtual switching node corresponding to the determined virtual switching node identifier, and allocates a virtual port identifier to the added virtual port.

When the SMF selects a physical port for the PDU session, the second message further includes a physical port identifier of the selected physical port. The second message is used to request the AF to add a virtual port and allocate a virtual port identifier. When receiving the second message that carries the identifier of the UPF and the physical port identifier of the UPF, the AF may determine a virtual switching node identifier based on the carried identifier of the UPF and the carried physical port identifier, such that the AF adds a virtual port to a virtual switching node corresponding to the virtual switching node identifier and allocates a virtual port identifier to the added virtual port.

In a possible implementation, when the SMF maintains a correspondence between an identifier of each UPF and a virtual switching node identifier, the second message includes a virtual switching node identifier, and the virtual switching node identifier is a virtual switching node identifier corresponding to the selected UPF. As such, the AF can determine a virtual switching node identified by the virtual switching node identifier, add a virtual port to the virtual switching node, and allocate a virtual port identifier.

When the SMF selects a physical port for the PDU session, the second message further includes a physical port identifier of the selected physical port. If the SMF maintains a correspondence between a physical port identifier of each UPF and a virtual switching node identifier, the virtual switching node identifier included in the second message may be a virtual switching node identifier corresponding to the physical port identifier of the selected physical port.

In a possible implementation, the second message includes the identifier of the UPF and a virtual switching node identifier, where the virtual switching node identifier is a virtual switching node identifier corresponding to the identifier of the UPF. When the SMF selects a physical port for the PDU session, the virtual switching node identifier carried in the second message is a virtual switching node identifier corresponding to a physical port identifier of the physical port.

It may be understood that in a process in which the UE establishes a PDU session, when the SMF does not select a physical port for the PDU session, all physical ports of one UPF belong to a same virtual switching node.

Optionally, the second message further includes the DNN information and/or the TSN identifier, and the DNN information is used to indicate that the data network is a deterministic transmission network. The DNN information and/or the TSN identifier is used to determine a deterministic transmission requirement.

The second message may be sent together with another message sent by the SMF to the AF, or may be independent of another message sent by the SMF to the AF. Further, messages between the SMF and the AF may be combined and sent, and the SMF or the AF may further process, in a combination manner, the messages to be combined and sent. Still further, in this embodiment of this application, messages between network elements may be combined and sent, and the network element may process, in a combination manner, the messages to be combined and sent.

For example, in the process in which the UE establishes the PDU session, the UPF sends the first message to the SMF. When receiving the first message from the UPF, the SMF may not immediately forward the first message to the AF, but sends both the first message and the second message to the AF when the SMF needs to send the second message to the AF. In this case, the AF creates, based on the identifier of the UPF selected by the SMF, a virtual switching node corresponding to the UPF, allocates a virtual switching node identifier, and allocates a virtual port identifier of the virtual switching node. Then the AF sends the allocated virtual switching node identifier and virtual port identifier to the SMF. Subsequently, when the UE establishes a PDU session again, the SMF sends, to the AF, at least one of a virtual switching node identifier or an identifier of a UPF corresponding to the PDU session, to request the AF to allocate a virtual port identifier.

Optionally, the SMF has processing logic: For a message sent by the SMF for the first time, when the message needs to be sent for the $N^{th}$ time (N>1, and N is an integer), if content included in the message and a purpose of the content do not change, the message may not be sent for the $N^{th}$ time. For example, for a physical port identifier that is of a UPF and that is used to create a virtual switching node, the SMF needs to send the physical port identifier of the UPF to the AF only for the first time, and when the SMF subsequently requests the AF to allocate a virtual port identifier to another user session or another PDU session of the UE on the same UPF or virtual switching node, the SMF does not need to send the physical port identifier of the UPF to the AF. If a function of the content included in the message has another purpose, the message is still sent for the $N^{th}$ time. For example, if the physical port identifier of the UPF is used to identify a physical port of the UPF in a port pair, the SMF needs to send the physical port identifier of the UPF to the AF.

Step S1036: The AF allocates a virtual port identifier to the PDU session. For example, the AF allocates the virtual port identifier to a virtual switching node corresponding to the PDU session.

In a possible implementation, the second message includes the identifier of the UPF, and the AF determines a virtual switching node identifier corresponding to the identifier of the UPF, where the virtual switching node identifier is a virtual switching node identifier corresponding to the PDU session. If the AF has created a virtual switching node identified by the virtual switching node identifier, the AF adds a virtual port to the virtual switching node and allocates a virtual port identifier to the added virtual port. If the AF has not created a virtual switching node identified by the virtual switching node identifier, the AF creates a virtual switching node identified by the virtual switching node identifier, adds a virtual port to the virtual switching node, and allocates a virtual port identifier to the added virtual port.

In a possible implementation, the second message includes the virtual switching node identifier. If the AF has created a virtual switching node identified by the virtual switching node identifier, the AF adds a virtual port to the virtual switching node and allocates a virtual port identifier to the added virtual port. If the AF has not created a virtual switching node identified by the virtual switching node identifier, the AF creates a virtual switching node identified by the virtual switching node identifier, adds a virtual port to the virtual switching node, and allocates a virtual port identifier to the added virtual port.

In a possible implementation, the second message includes the identifier of the UPF and the virtual switching node identifier. If the AF has created a virtual switching node identified by the virtual switching node identifier, the AF adds a virtual port to the virtual switching node and allocates a virtual port identifier to the added virtual port. If the AF has not created a virtual switching node identified by the virtual switching node identifier, the AF creates a virtual switching node identified by the virtual switching node identifier, adds a virtual port to the virtual switching node, and allocates a virtual port identifier to the added virtual port.

The AF may add the virtual port and allocate the virtual port identifier at a granularity of UE, that is, allocate different virtual ports to different UEs, or at a granularity of a PDU session, that is, allocate different virtual ports to different PDU sessions of a same UE, or at a granularity of a TSN identifier, that is, allocate different virtual ports to different TSNs.

The virtual port identifier allocated by the AF to the virtual port is unique on the virtual switching node. In other words, the AF does not allocate a same virtual port identifier to different virtual ports on a same switching node.

After allocating the virtual port identifier, the AF may feed back the allocated virtual port identifier to the SMF, such that the SMF can learn of the virtual port identifier allocated by the AF, and further obtain an internal processing delay and the like based on the virtual port identifier. Optionally, the AF may further feed back, to the SMF, the virtual switching node identifier corresponding to the PDU session, such that the SMF learns of a correspondence between the virtual port identifier and the virtual switching node identifier.

Step S104: The AF obtains attribute information of the virtual switching node.

When a UPF corresponding to the PDU session reports a physical port identifier of the UPF, the AF may obtain attribute information of a physical port of the UPF. When the AF allocates the virtual port identifier to the PDU session, the AF may obtain attribute information of a virtual port. When a port pair relationship is created for the virtual switching node corresponding to the PDU session, an internal processing delay of the port pair may be obtained.

Step S105: The AF sends the attribute information of the virtual switching node to the TSN. Correspondingly, the TSN receives the attribute information of the virtual switching node from the AF.

Step S106: The TSN registers or updates the virtual switching node.

In Embodiment 2 shown in FIG. 6A and FIG. 6B, in the process in which the UE establishes the PDU session, the SMF selects the UPF for the PDU session, the SMF requests the AF to allocate the virtual port identifier to the PDU session, and the AF obtains the attribute information of the virtual switching node corresponding to the PDU session, such that the AF requests the TSN to register or update the virtual switching node, to implement deterministic transmission in a 5G system.

Figure 7A:
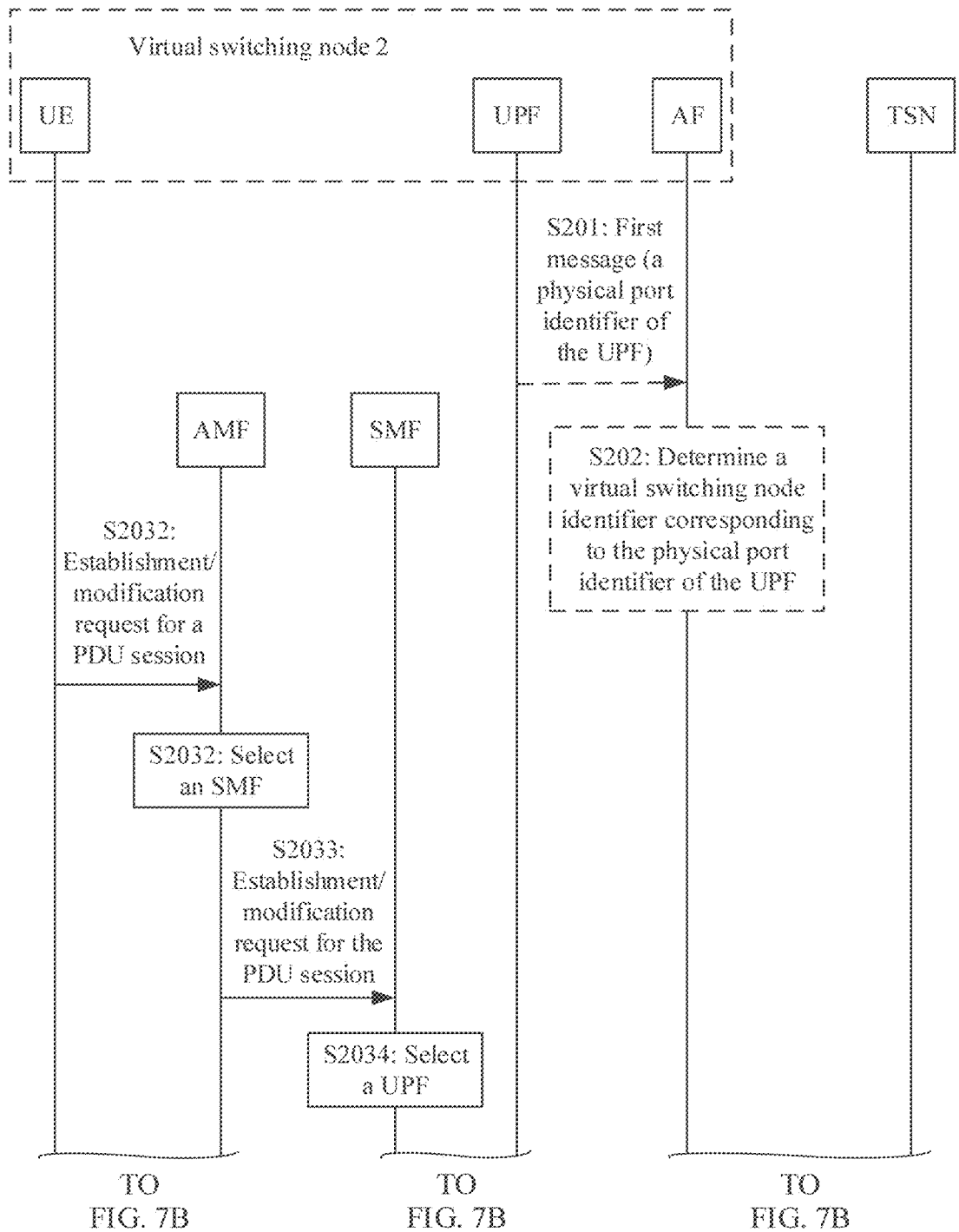
FIG. 7A and FIG. 7B are schematic flowcharts of a time-sensitive networking communication method according to Embodiment 3 of this application.
Figure 7B:
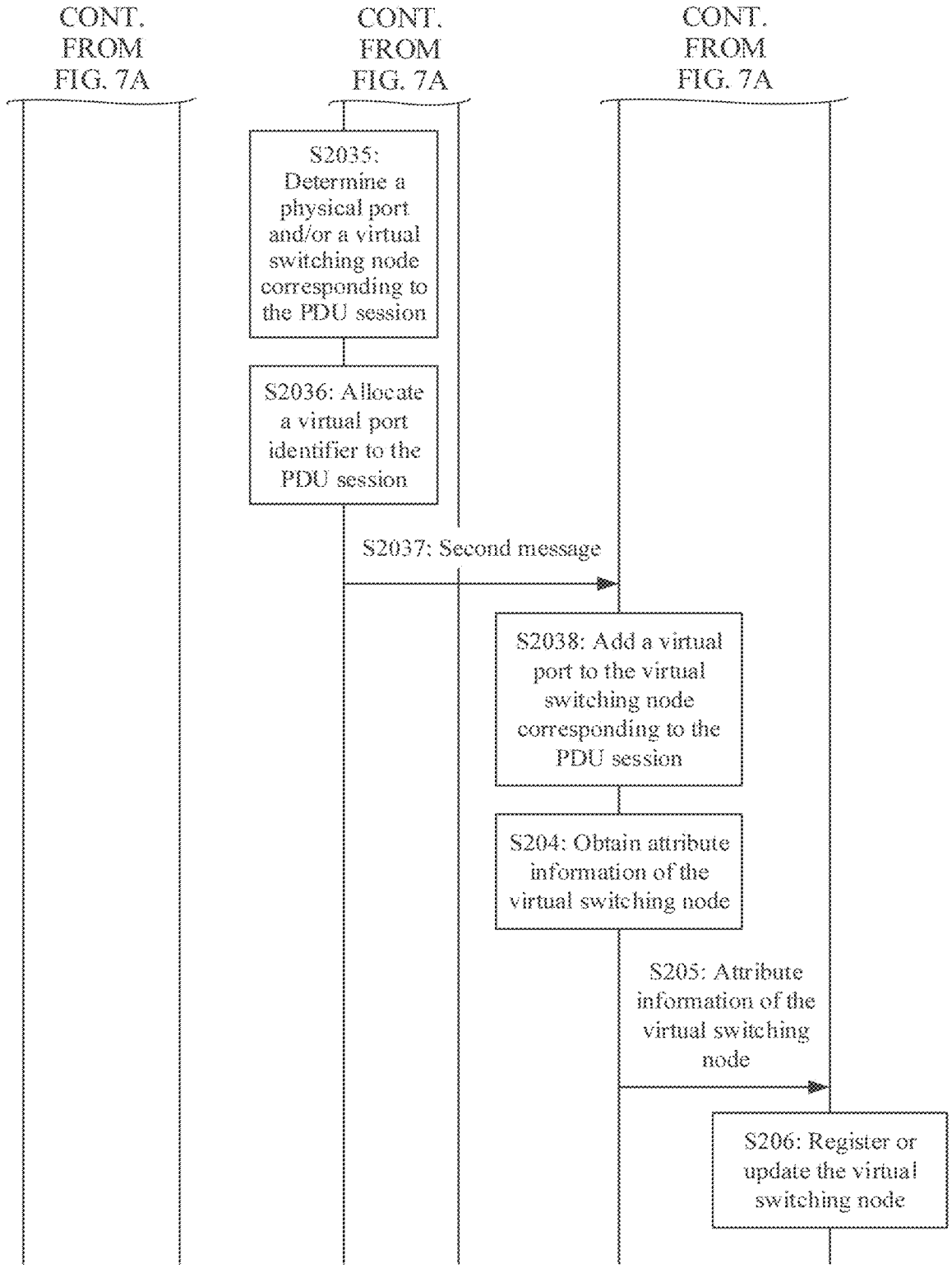

An example in which an embodiment of this application is applied to the schematic diagram of the network architecture shown in FIG. 4B is used. FIG. 7A and FIG. 7B are schematic flowcharts of a time-sensitive networking communication method according to Embodiment 3 of this application. The method may include:

In a process in which a UE establishes a PDU session, an SMF or an AF determines at least one of a physical port or a virtual switching node corresponding to the PDU session. The SMF allocates a virtual port identifier to the virtual switching node corresponding to the PDU session, and the SMF sends the virtual port identifier to the AF, to request the AF to add a virtual port corresponding to the virtual port identifier. The AF obtains attribute information of the virtual switching node, where the attribute information includes attribute information of the physical port and attribute information of the virtual port, and the AF sends the attribute information of the virtual switching node to a TSN, such that the TSN registers or updates the virtual switching node.

For example, the embodiment shown in FIG. 7A and FIG. 7B may include but is not limited to the following steps. For a part that is in the embodiment shown in FIG. 7A and FIG. 7B and that is the same as that in the embodiments shown in FIG. 5 and FIG. 6A and FIG. 6B, refer to descriptions of a corresponding part in the embodiments shown in FIG. 5 and FIG. 6A and FIG. 6B. Details are not described herein again.

Step S201: A UPF sends a first message to the AF, where the first message includes a physical port identifier of the UPF. Correspondingly, the AF receives the first message from the UPF.

Step S202: The AF determines a virtual switching node identifier corresponding to the physical port identifier of the UPF.

Step S2031: The UE sends an establishment/modification request for the PDU session to an AMF over an (R)AN. Correspondingly, the AMF receives the establishment/modification request for the PDU session from the UE.

Step S2032: The AMF selects an SMF for the PDU session.

Step S2033: The AMF sends the establishment/modification request for the PDU session to the selected SMF. Correspondingly, the SMF receives the establishment/modification request for the PDU session from the AMF.

Step S2034: The SMF selects a UPF for the PDU session.

Step S2035: The SMF determines at least one of a physical port or a virtual switching node corresponding to the PDU session.

The SMF may select the physical port corresponding to the PDU session in step S2034, or may select the physical port corresponding to the PDU session after step S2034 is performed, to determine the physical port corresponding to the PDU session.

When maintaining a correspondence between an identifier of each UPF and a virtual switching node identifier and selecting the UPF corresponding to the PDU session, the SMF may determine a virtual switching node identifier corresponding to the PDU session, to determine the virtual switching node corresponding to the PDU session.

The SMF may alternatively report, to the AF, a physical port identifier corresponding to the PDU session. When determining a virtual switching node identifier corresponding to the physical port identifier, the AF feeds back the virtual switching node identifier to the SMF. Then the SMF determines, based on the feedback from the AF, the virtual switching node corresponding to the PDU session. Alternatively, the SMF reports, to the AF, an identifier of the UPF corresponding to the PDU session. When determining a virtual switching node identifier corresponding to the identifier of the UPF, the AF feeds back the virtual switching node identifier to the SMF. Then, the SMF determines, based on the feedback from the AF, the virtual switching node corresponding to the PDU session.

Step S2035 may alternatively be performed by the AF. In other words, the AF determines at least one of the physical port or the virtual switching node corresponding to the PDU session. Manner 1: When selecting the UPF corresponding to the PDU session, the SMF reports an identifier of the UPF to the AF. The AF selects, based on the identifier of the UPF, a virtual switching node identifier corresponding to the UPF, to determine the virtual switching node corresponding to the PDU session. The AF may determine a corresponding physical port identifier based on the virtual switching node identifier. Manner 2: When selecting the UPF and the physical port that correspond to the PDU session, the SMF reports an identifier of the UPF and a physical port identifier to the AF. The AF determines a corresponding virtual switching node identifier based on the identifier of the UPF and the physical port identifier, to determine the virtual switching node corresponding to the PDU session.

When determining at least one of the physical port or the virtual switching node corresponding to the PDU session, the AF may send at least one of the physical port identifier or the virtual switching node identifier to the SMF. As such, the SMF learns of at least one of the physical port or the virtual switching node corresponding to the PDU session.

Step S2036: The SMF allocates a virtual port identifier to the PDU session. For example, the SMF allocates the virtual port identifier to the virtual switching node corresponding to the PDU session.

When the SMF determines the virtual switching node corresponding to the PDU session, the SMF may directly allocate the virtual port identifier to the virtual switching node.

A virtual port identifier allocated by the SMF to a virtual port is unique on the virtual switching node. In other words, the SMF does not allocate a same virtual port identifier to different virtual ports on a same switching node.

After allocating the virtual port identifier to the virtual switching node, the SMF may send the virtual port identifier to the UPF, such that the UPF learns of the virtual port identifier corresponding to the PDU session.

Step S2037: The SMF sends a second message to the AF, where the second message includes the virtual port identifier. Correspondingly, the AF receives the second message from the SMF.

The second message is used to request the AF to add, to the virtual switching node, a virtual port corresponding to the virtual port identifier.

The second message further includes at least one of the identifier of the UPF or the virtual switching node identifier. Optionally, the second message further includes DNN information and/or a TSN identifier.

Step S2038: The AF adds the virtual port to the virtual switching node corresponding to the PDU session.

When the AF receives the second message, because the second message includes the virtual port identifier, the AF may learn of, from the second message, the virtual port identifier of the virtual switching node corresponding to the PDU session, and add, to the virtual switching node corresponding to the PDU session, the virtual port identified by the virtual port identifier.

When the second message includes the identifier of the UPF, the AF adds, to a virtual switching node corresponding to a physical port of the UPF, the virtual port identified by the virtual port identifier.

When the second message includes the virtual switching node identifier, the AF adds, to a virtual switching node identified by the virtual switching node identifier, the virtual port identified by the virtual port identifier. Optionally, in this case, the AF may establish a port pair relationship between the physical port identifier and the virtual port identifier of the virtual switching node.

It should be noted that the process in which the SMF allocates the virtual port identifier is not limited to being performed in the process of establishing the PDU session. An example in which the process is performed in the process of establishing the PDU session is used for description in the embodiment shown in FIG. 7A and FIG. 7B.

Step S204: The AF obtains attribute information of the virtual switching node.

Step S205: The AF sends the attribute information of the virtual switching node to the TSN. Correspondingly, the TSN receives the attribute information of the virtual switching node from the AF.

Step S206: The TSN registers or updates the virtual switching node.

In Embodiment 3 shown in FIG. 7A and FIG. 7B, the UPF sends, to the AF, the physical port identifier configured by the UPF; in the process in which the UE establishes the PDU session, the AF or the SMF determines at least one of the physical port identifier or the virtual switching node identifier corresponding to the PDU session; the SMF allocates the virtual port identifier to the virtual switching node corresponding to the PDU session; and the AF obtains the attribute information of the virtual port and the attribute information of the physical port, such that the AF requests the TSN to register or update the virtual switching node, to implement deterministic transmission in a 5G system.

Figure 8A:
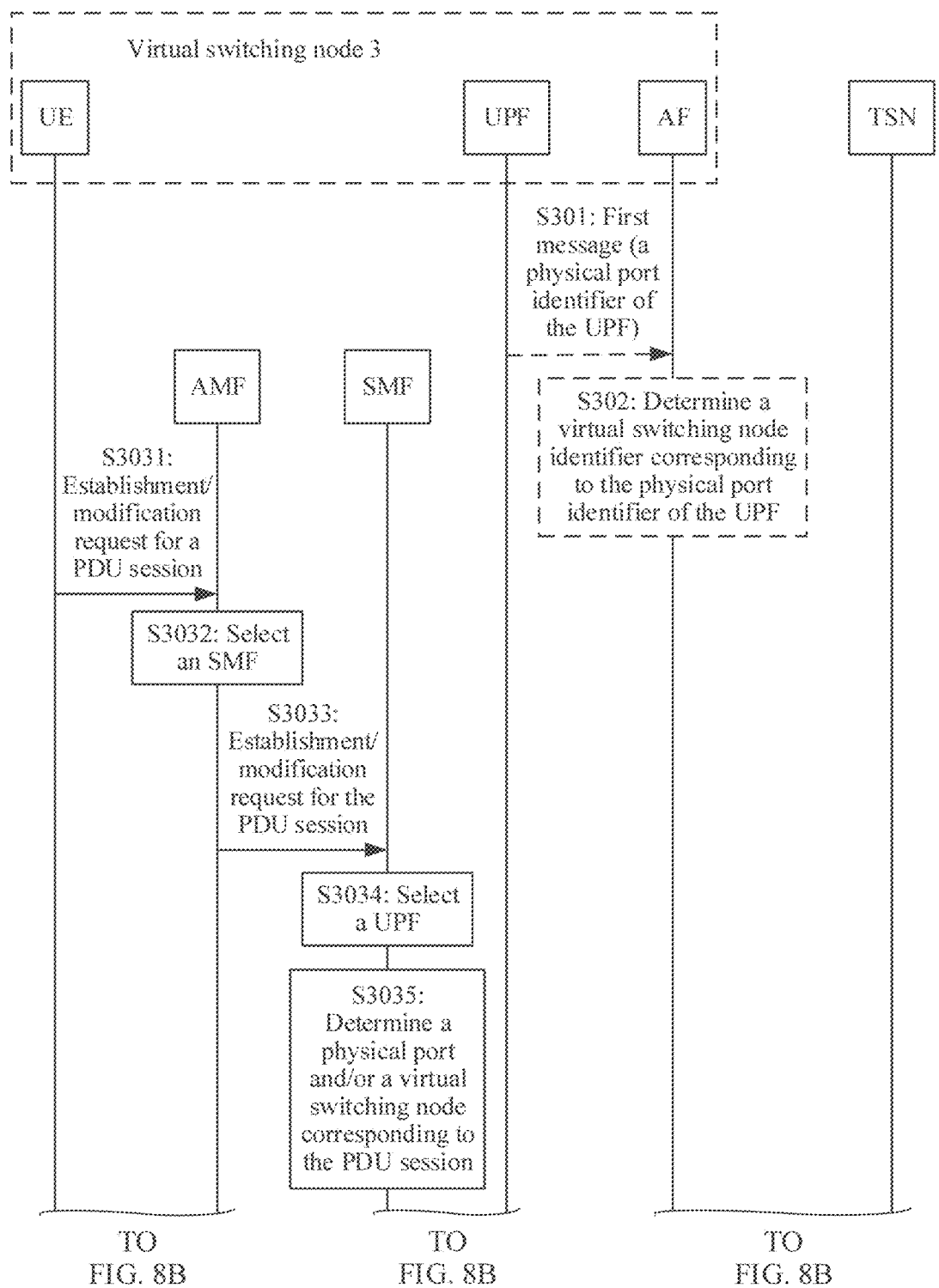
FIG. 8A and FIG. 8B are schematic flowcharts of a time-sensitive networking communication method according to Embodiment 4 of this application.
Figure 8B:
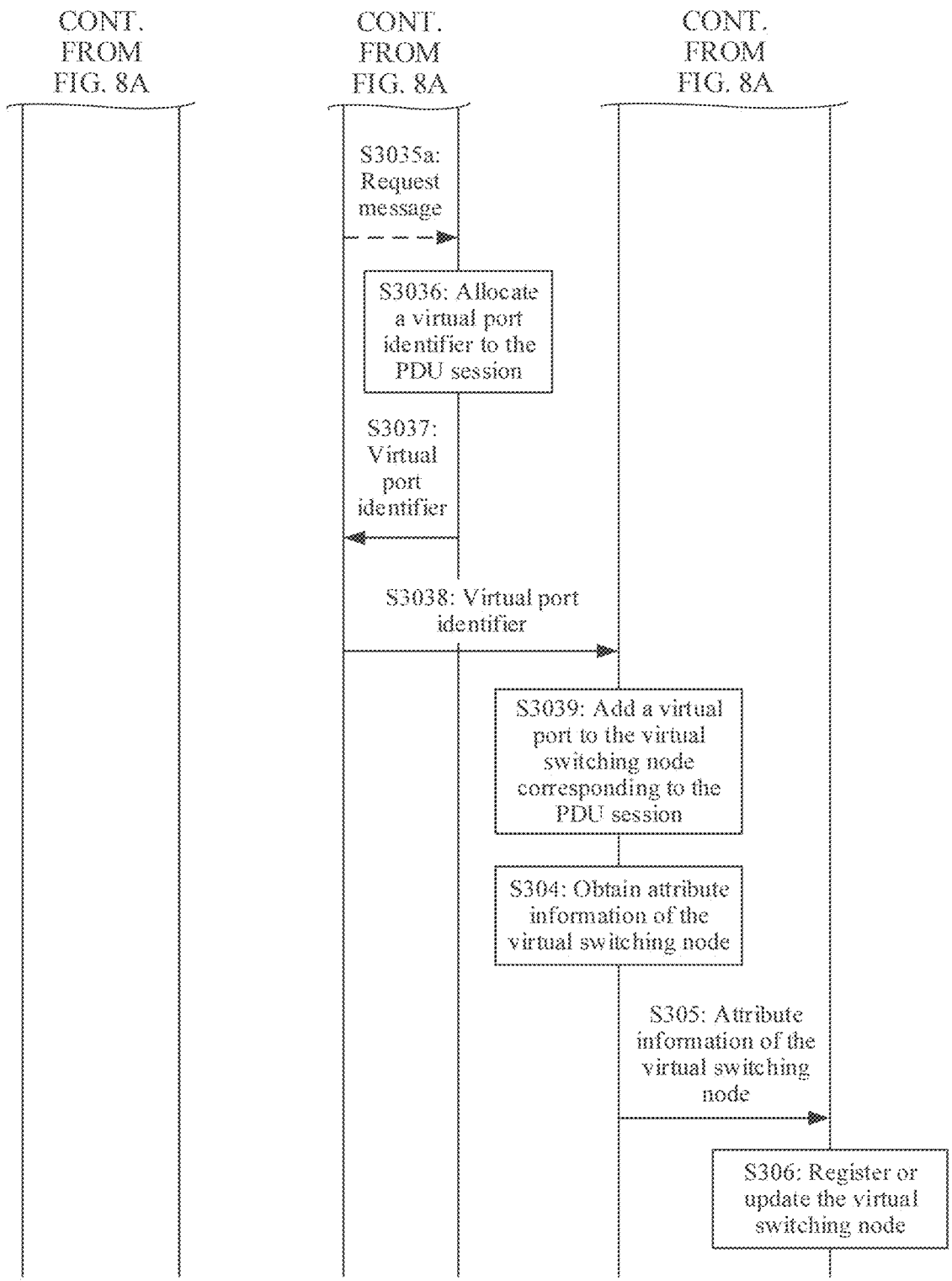

An example in which an embodiment of this application is applied to the schematic diagram of the network architecture shown in FIG. 4B is used. FIG. 8A and FIG. 8B are schematic flowcharts of a time-sensitive networking communication method according to Embodiment 4 of this application. The method may include:

In a process in which a UE establishes a PDU session, an SMF or an AF determines at least one of a physical port or a virtual switching node corresponding to the PDU session, and a UPF allocates a virtual port identifier to the virtual switching node corresponding to the PDU session, where the virtual port identifier allocated by the UPF may be directly sent to the AF or forwarded by the SMF to the AF. The AF obtains attribute information of the virtual switching node, where the attribute information includes attribute information of the physical port and attribute information of a virtual port, and the AF sends the attribute information of the virtual switching node to a TSN, such that the TSN registers or updates the virtual switching node.

For example, the embodiment shown in FIG. 8A and FIG. 8B may include but is not limited to the following steps. For a part that is in the embodiment shown in FIG. 8A and FIG. 8B and that is the same as that in the embodiments shown in FIG. 5 and FIG. 6A and FIG. 6B, refer to descriptions of a corresponding part in the embodiments shown in FIG. 5 and FIG. 6A and FIG. 6B. Details are not described herein again.

Step S301: A UPF sends a first message to the AF, where the first message includes a physical port identifier of the UPF. Correspondingly, the AF receives the first message from the UPF.

Step S302: The AF determines a virtual switching node identifier corresponding to the physical port identifier of the UPF.

Step S3031: The UE sends an establishment/modification request for the PDU session to an AMF over an (R)AN. Correspondingly, the AMF receives the establishment/modification request for the PDU session from the UE.

Step S3032: The AMF selects an SMF for the PDU session.

Step S3033: The AMF sends the establishment/modification request for the PDU session to the selected SMF. Correspondingly, the SMF receives the establishment/modification request for the PDU session from the AMF.

Step S3034: The SMF selects a UPF for the PDU session.

Step S3035: The SMF determines at least one of a physical port or a virtual switching node corresponding to the PDU session.

Optionally, after step S3035, step S3035a is further included: The SMF sends a request message to the UPF, where the request message is used to request the UPF to allocate a virtual port identifier. Correspondingly, the UPF receives the request message from the SMF.

Optionally, the request message may further include a virtual switching node identifier corresponding to the PDU session. When the UPF maintains a correspondence between a virtual switching node identifier and a physical port identifier, the SMF may include, in the request message, the virtual switching node identifier corresponding to the PDU session.

The request message may be a message independent of another message, or may be sent together with another message sent by the SMF to the UPF, or may be implicitly indicated by a message sent by the SMF to the UPF.

Step S3036: The UPF allocates a virtual port identifier.

The UPF allocates the virtual port identifier to the virtual switching node corresponding to the PDU session, records a correspondence between the allocated virtual port identifier and the PDU session, and optionally further records the corresponding virtual switching node identifier.

In a possible implementation, when the UPF receives the request message from the SMF, the UPF allocates the virtual port identifier to the virtual switching node corresponding to the PDU session.

In a possible implementation, the UPF obtains DNN information of the PDU session from the SMF, and determines that the PDU session has a deterministic transmission requirement, and the UPF allocates the virtual port identifier to the virtual switching node corresponding to the PDU session. The UPF may alternatively obtain the DNN information of the PDU session in another manner.

Step S3037: The UPF sends the virtual port identifier to the SMF. Correspondingly, the SMF receives the virtual port identifier from the UPF.

The virtual port identifier sent by the UPF to the SMF may be sent together with another message sent by the UPF to the SMF, for example, sent together with external topology information of the physical port sent by the UPF to the SMF. When step S3036 is performed, the UPF may send the virtual port identifier to the SMF through a response message, where the response message is used to respond to the request message.

Optionally, the UPF sends the virtual switching node identifier to the SMF.

Step S3038: The SMF sends the virtual port identifier to the AF. Correspondingly, the AF receives the virtual port identifier from the SMF.

The SMF sends the virtual port identifier to the AF, to request the AF to add, to the virtual switching node corresponding to the PDU session, a virtual port corresponding to the virtual port identifier.

In a possible implementation, when allocating the virtual port identifier to the virtual switching node, the UPF may directly send a third message to the AF, where the third message includes the virtual port identifier. As such, the AF adds, to the virtual switching node corresponding to the PDU session, the virtual port corresponding to the virtual port identifier.

It should be noted that the process in which the UPF allocates the virtual port identifier is not limited to being performed in the process of establishing the PDU session. An example in which the process is performed in the process of establishing the PDU session is used for description in the embodiment shown in FIG. 8A and FIG. 8B.

Step S3039: The AF adds the virtual port to the virtual switching node corresponding to the PDU session.

Step S304: The AF obtains attribute information of the virtual switching node.

Step S305: The AF sends the attribute information of the virtual switching node to the TSN. Correspondingly, the TSN receives the attribute information of the virtual switching node from the AF.

Step S306: The TSN registers or updates the virtual switching node.

In Embodiment 4 shown in FIG. 8A and FIG. 8B, the UPF reports, to the AF, the physical port identifier configured by the UPF. In the process in which the UE establishes the PDU session, the AF or the SMF determines at least one of the physical port identifier or the virtual switching node identifier corresponding to the PDU session. Further, the UPF allocates the virtual port identifier to the virtual switching node corresponding to the PDU session, and the AF obtains attribute information of the virtual port and the physical port. This helps the AF request the TSN to register or update the virtual switching node, to implement deterministic transmission in a 5G system.

Figure 9:
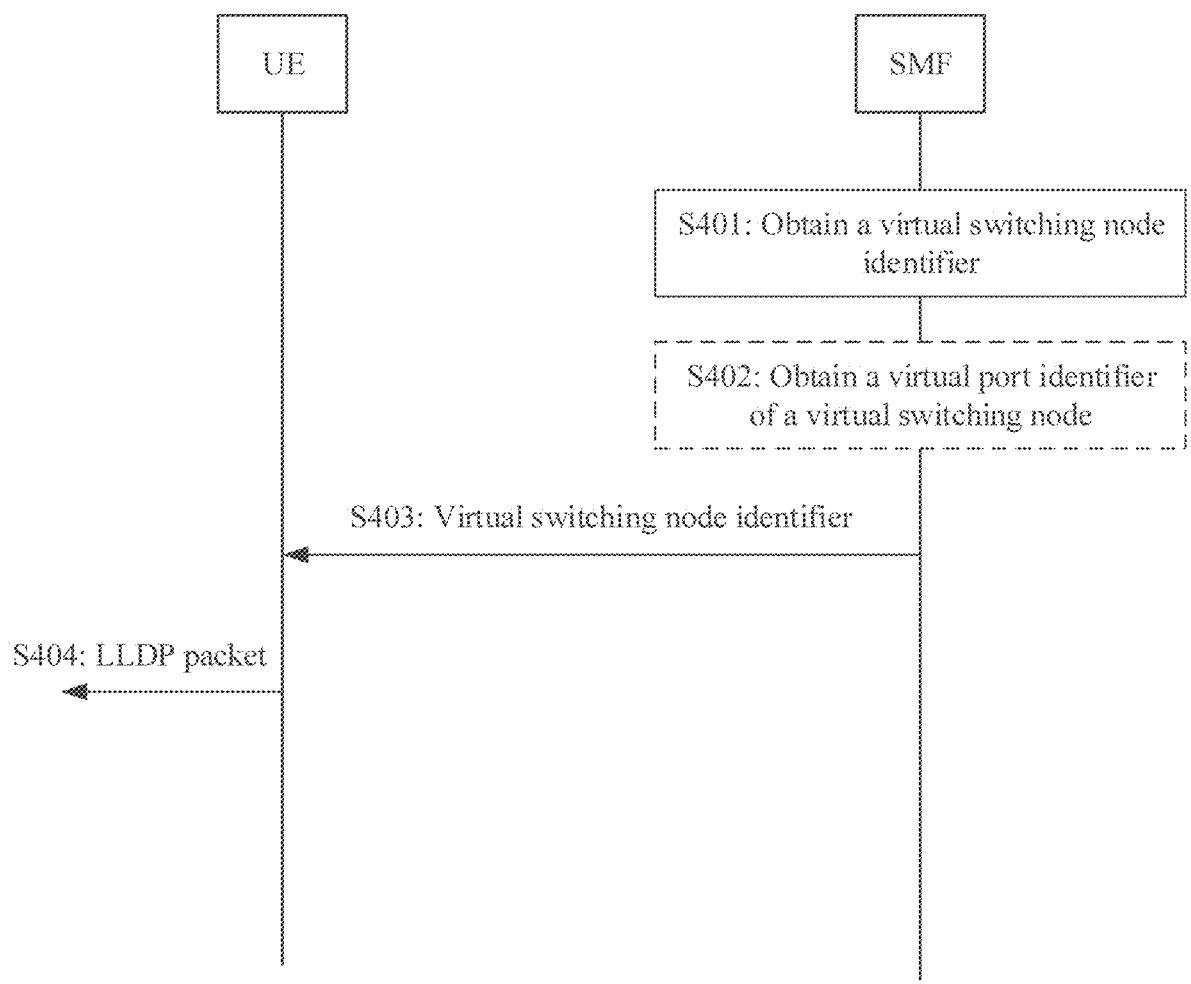
FIG. 9 is a schematic flowchart of a time-sensitive networking communication method according to Embodiment 5 of this application.

An example in which an embodiment of this application is applied to the schematic diagram of the network architecture shown in FIG. 4B is used. FIG. 9 is a schematic flowchart of a time-sensitive networking communication method according to Embodiment 5 of this application. The method may include the following steps.

Step S401: An SMF obtains a virtual switching node identifier.

The SMF may obtain the virtual switching node identifier by receiving a message from an AF, for example, obtain a virtual switching node identifier corresponding to a PDU session, or obtain the virtual switching node identifier based on a correspondence, maintained or configured by the SMF, between a physical port identifier and a virtual switching node identifier. For details, refer to corresponding descriptions in the embodiments shown in FIG. 5 to FIG. 8A and FIG. 8B.

Optionally, after step S401, step S402 is further included: The SMF obtains a virtual port identifier of a virtual switching node.

The SMF may allocate the virtual port identifier to the virtual switching node to obtain the virtual port identifier of the virtual switching node, or may obtain the virtual port identifier of the virtual switching node by receiving a message from the AF, or may obtain the virtual port identifier of the virtual switching node by receiving a message from a UPF. For details, refer to corresponding descriptions in the embodiments shown in FIG. 5 to FIG. 7A and FIG. 7B.

Step S403: The SMF sends the virtual switching node identifier to a UE. Correspondingly, the UE receives the virtual switching node identifier from the SMF.

The SMF may send the virtual switching node identifier obtained in step S401 to the UE. Optionally, the SMF further sends the virtual port identifier obtained in step S402 to the UE. Optionally, the SMF further sends, to the UE, a physical port identifier corresponding to the virtual switching node identifier. Optionally, the SMF further sends, to the UE, a TSN identifier corresponding to the virtual port identifier, where the TSN identifier corresponding to the virtual port identifier is sent in a TSN domain identified by the TSN identifier.

Alternatively, the SMF may directly send, to the UE, the virtual switching node identifier and the virtual port identifier that are stored by the SMF.

Step S404: The UE sends an LLDP packet to a peer device. Correspondingly, the peer device receives the LLDP packet from the UE.

After obtaining the virtual switching node identifier and the virtual port identifier, the UE sends the LLDP packet to the peer device (which may be a virtual device), or enables, through internal interaction, the peer device to obtain topology information, where the topology information includes an identifier and a virtual port identifier of a virtual switching node on which the UE/the PDU session is located.

When receiving the LLDP packet, the peer device may obtain attribute information of a virtual port of the virtual switching node based on the LLDP packet, and then send the attribute information of the virtual port of the virtual switching node to a TSN. The TSN registers or updates the virtual switching node based on the attribute information of the virtual port of the virtual switching node.

In Embodiment 5 shown in FIG. 9, when obtaining the virtual switching node identifier and the virtual port identifier, the SMF sends the virtual switching node identifier and the virtual port identifier to the UE, such that the UE sends the LLDP packet to the peer device. The peer device may learn of the attribute information of the virtual port of the virtual switching node, and the peer device requests the TSN to register or update the virtual switching node, to implement deterministic transmission in a 5G system.

Figure 10A:
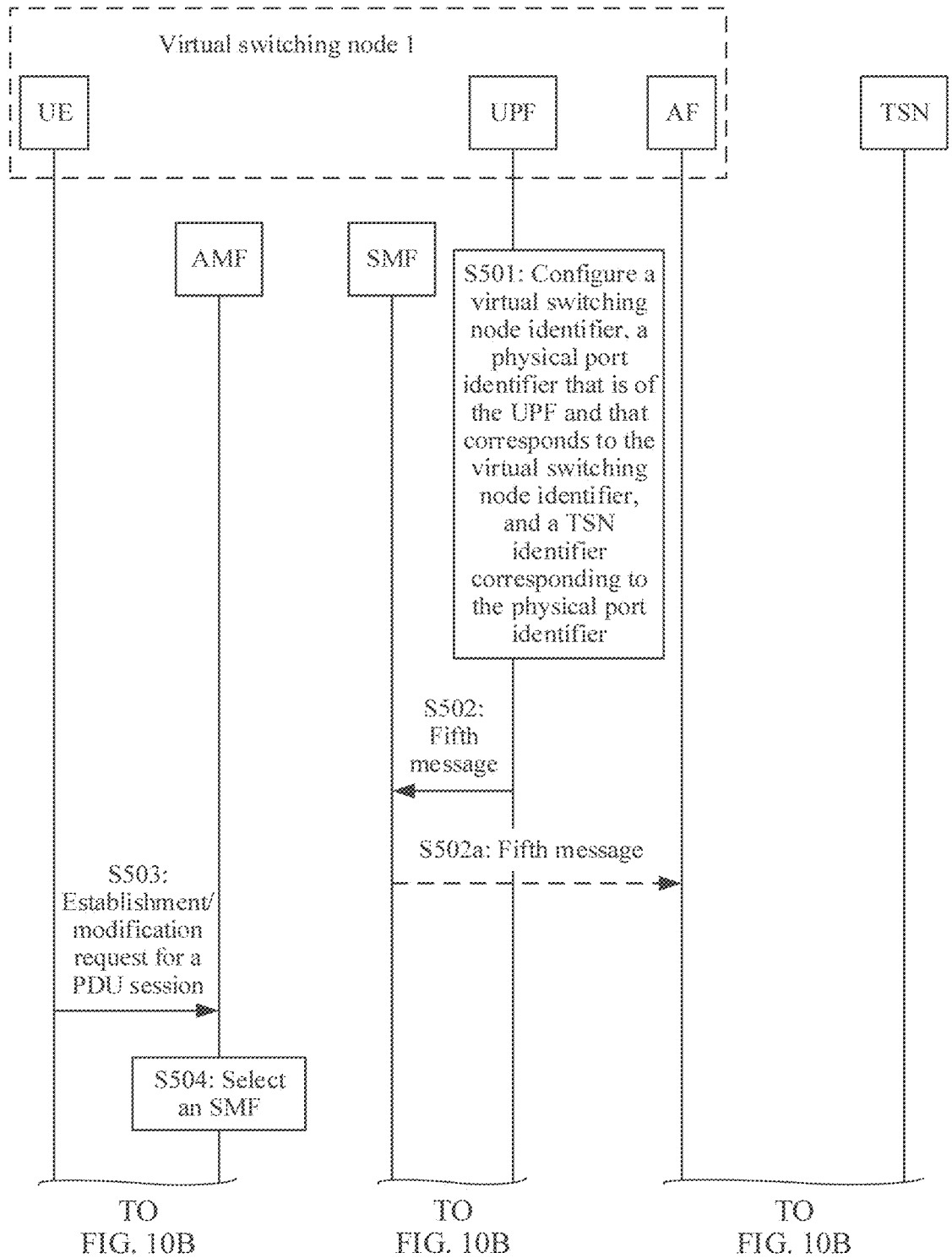
FIG. 10A, FIG. 10B, and FIG. 10C are schematic flowcharts of a time-sensitive networking communication method according to Embodiment 6 of this application.
Figure 10B:
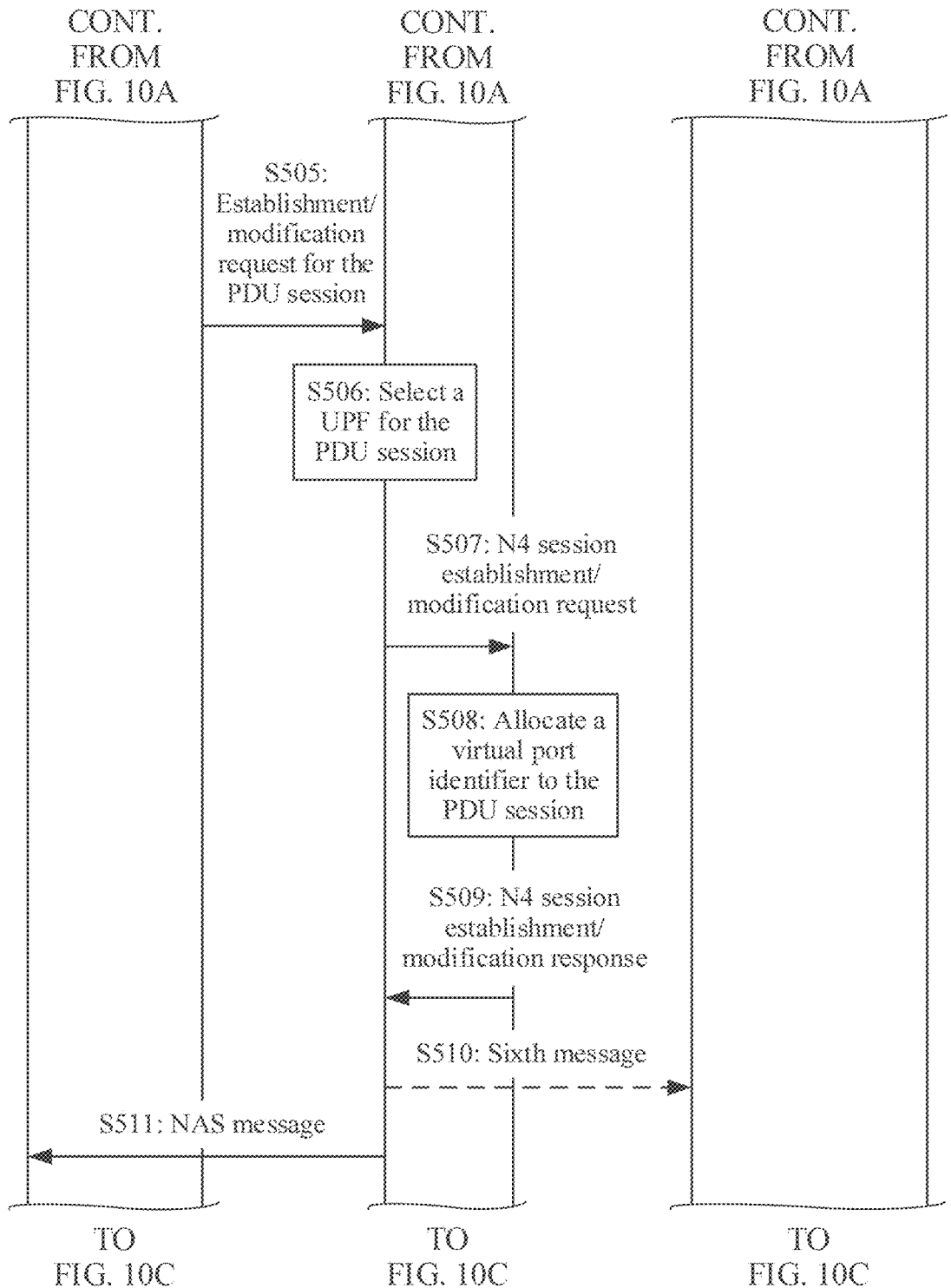
Figure 10C:
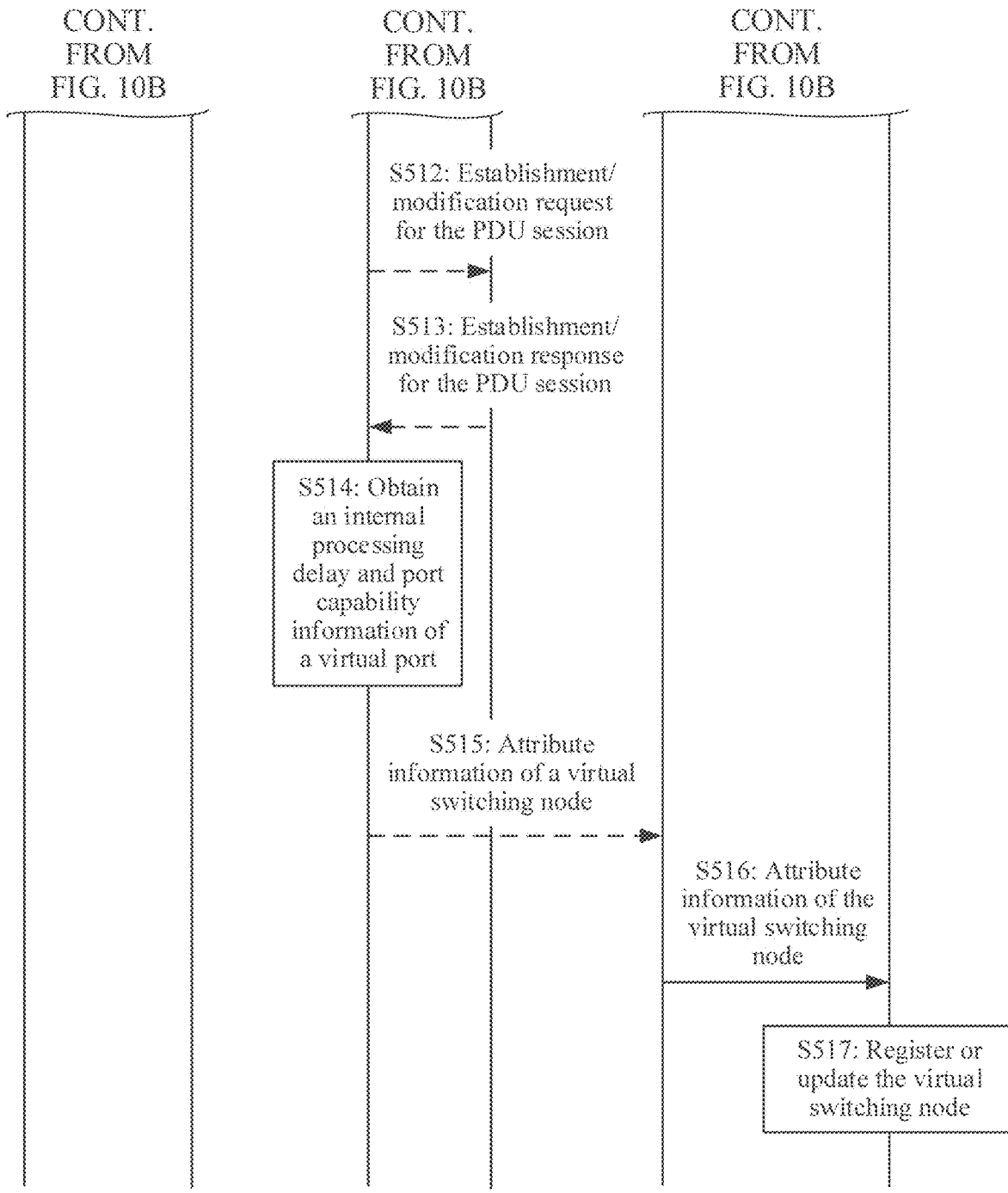

An example in which an embodiment of this application is applied to the schematic diagram of the network architecture shown in FIG. 4B is used. FIG. 10A, FIG. 10B, and FIG. 10C are schematic flowcharts of a time-sensitive networking communication method according to Embodiment 6 of this application. The method may include the following steps.

Step S501: A UPF configures a virtual switching node identifier, a physical port identifier that is of the UPF and that corresponds to the virtual switching node identifier, and a TSN identifier corresponding to the physical port identifier.

Step S502: The UPF sends a fifth message to an SMF, where the fifth message includes the virtual switching node identifier, the physical port identifier that is of the UPF and that corresponds to the virtual switching node identifier, and the TSN identifier corresponding to the physical port identifier. Correspondingly, the SMF receives the fifth message from the UPF.

It may be understood that in step S502, the UPF sends, to the SMF, information configured by the UPF, such that the SMF learns of configuration information on the UPF.

After step S502, step S502a may be further included: The SMF sends the fifth message to an AF. Correspondingly, the AF receives the fifth message from the SMF. The fifth message sent by the SMF to the AF may be directly sent to the AF, or may be forwarded by a PCF or an NEF to the AF, such that the AF learns of the configuration information on the UPF. It may be understood that in steps S502 and S502a, the UPF reports the configuration information on the UPF to the AF through the SMF, or the UPF may directly report the configuration information on the UPF to the AF.

A moment of sending the fifth message is not limited in the embodiments of this application.

Step S503: A UE sends an establishment/modification request for a PDU session to an AMF over an (R)AN. Correspondingly, the AMF receives the establishment/modification request for the PDU session from the UE.

Optionally, the establishment/modification request for the PDU session includes at least one of a TSN identifier or DNN information.

Step S504: The AMF selects an SMF for the PDU session.

Step S505: The AMF sends the establishment/modification request for the PDU session to the selected SMF. Correspondingly, the SMF receives the establishment/modification request for the PDU session from the AMF.

Step S506: The SMF selects a UPF for the PDU session.

Step S507: The SMF sends an N4 session establishment/modification request to the selected UPF. Correspondingly, the UPF receives the N4 session establishment/modification request from the SMF.

For example, the SMF sends the N4 session establishment/modification request to the UPF selected in step S506. The UPF in steps S501 and S502 may be any UPF on a network. To be more specific, any UPF on the network sends configuration information on the UPF to the SMF, and the SMF sends the configuration information on the UPF to the AF. In the embodiment shown in FIG. 10A, FIG. 10B, and FIG. 10C, it is assumed that the UPFs in steps S501, S502, and S506 are a same UPF.

Step S508: The UPF allocates a virtual port identifier to the PDU session.

The UPF allocates the virtual port identifier to the PDU session, to be more specific, allocates the virtual port identifier to a virtual switching node corresponding to the PDU session. Step S508 may be triggered by step S507 or another step. In this case, a plurality of virtual port identifiers may be allocated by the UPF. For example, one port may be virtualized for a TSN domain identified by a TSN identifier corresponding to each PDU session.

Step S509: The UPF sends an N4 session establishment/modification response to the SMF. Correspondingly, the SMF receives the N4 session establishment/modification response from the UPF.

The N4 session establishment/modification response includes the virtual port identifier allocated by the UPF to the PDU session.

Optionally, after step S509, step S510 may be further included: The SMF sends a sixth message to the AF. Correspondingly, the AF receives the sixth message from the SMF.

The sixth message includes a virtual switching node identifier, the virtual port identifier, and a TSN identifier corresponding to the virtual port identifier. The sixth message sent by the SMF to the AF may be directly sent to the AF, or may be forwarded by the PCF or the NEF to the AF.

In step S502, the fifth message sent by the SMF to the AF may be combined with the sixth message and sent. If the fifth message and the sixth message are combined and sent after step S509 is performed, the SMF may send content included in the fifth message only once. In other words, after the SMF sends, to the AF, the physical port identifier that is of the UPF and that is used to register the virtual switching node, when step S510 is performed again, the content included in the fifth message does not need to be sent.

Step S511: The SMF sends a non-access stratum (NAS) message to the UE. Correspondingly, the UE receives the NAS message from the SMF.

The NAS message may be a PDU session complete message, and the message may include a virtual switching node identifier and the virtual port identifier that correspond to the PDU session. As such, the UE learns of the virtual switching node identifier and the virtual port identifier that correspond to the PDU session, and the UE obtains attribute information of a virtual port identified by the virtual port identifier. For example, the attribute information is external topology information and an external sending delay.

Optionally, after step S511, steps S512 and step S513 may be further included.

Step S512: The SMF sends the establishment/modification request for the PDU session to the UPF. Correspondingly, the UPF receives the establishment/modification request for the PDU session from the SMF.

The SMF sends the establishment/modification request for the PDU session to the UPF through an N4 interface. The establishment/modification request for the PDU session may be used to indicate the UPF to detect an internal processing delay between the UPF and a UE-side virtual port.

Step S513: The UPF sends an establishment/modification response for the PDU session to the SMF. Correspondingly, the SMF receives the establishment/modification response for the PDU session from the UPF.

After completing detection, the UPF sends the establishment/modification response for the PDU session to the SMF through the N4 interface. The establishment/modification response for the PDU session is used to indicate the detected internal processing delay.

Optionally, the establishment/modification response for the PDU session is further used to indicate a physical port that is of the UPF and that corresponds to the PDU session. For example, the physical port is a physical port that is of the selected UPF, that corresponds to a same virtual switching node as the PDU session/flow, and that has same DNN information and/or a same TSN identifier as the PDU session/flow.

Step S514: The SMF obtains the internal processing delay and port capability information of the virtual port.

The SMF may obtain the internal processing delay through execution of steps S512 and S513, or through reporting by the UPF, or by requesting the internal processing delay from the UPF/PCF. The port capability information of the virtual port includes the external topology information, the external sending delay, and the like.

Optionally, the SMF determines a port pair relationship of the virtual switching node based on a TSN identifier. For example, if a TSN identifier corresponding to the virtual port is the same as a TSN identifier corresponding to a physical port of the UPF, a port pair relationship between the two ports may be established. The SMF may alternatively determine the port pair relationship of the virtual switching node in another manner.

Optionally, after step S514, step S515 is further included: The SMF sends attribute information of the virtual switching node to the AF. Correspondingly, the AF receives the attribute information of the virtual switching node from the SMF.

The attribute information of the virtual switching node sent in step S515 may be sent together with the fifth message and/or the sixth message.

The SMF may directly send the attribute information of the virtual switching node to the AF, or may send the attribute information of the virtual switching node to the AF through the PCF/the NEF.

Step S516: The AF sends the attribute information of the virtual switching node to a TSN. Correspondingly, the TSN receives the attribute information of the virtual switching node from the AF.

Step S517: The TSN registers or updates the virtual switching node.

In Embodiment 6 shown in FIG. 10A, FIG. 10B, and FIG. 10C, the UPF sends the configuration information on the UPF to the SMF, which sends the configuration information to the AF. In a process of establishing the PDU session, the SMF selects the UPF based on the obtained TSN identifier, and triggers the UPF to allocate the virtual port identifier to the PDU session. The UPF notifies the SMF of the virtual port identifier allocated by the UPF, and the SMF notifies the AF of the virtual port identifier. Then the AF obtains the attribute information of the virtual port and attribute information of the physical port, such that the AF requests the TSN to register or update the virtual switching node, to implement deterministic transmission in a 5G system.

In the embodiments shown in FIG. 6A and FIG. 6B to FIG. 10A, FIG. 10B, and FIG. 10C, the process of establishing the PDU session is used as an example for description. In actual application, the embodiments of this application may alternatively be applied to another process.

The foregoing describes in detail the method in the embodiments of this application. The following provides an apparatus in the embodiments of this application.

Figure 11:
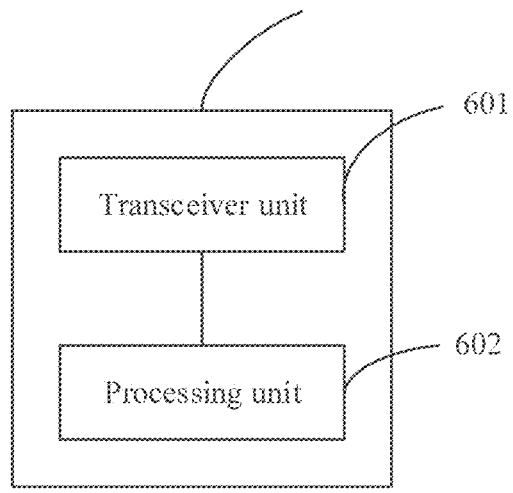
FIG. 11 is a schematic diagram of a logical structure of a communications apparatus according to an embodiment of this application.

FIG. 11 is a schematic diagram of a logical structure of a communications apparatus 60 according to an embodiment of this application. The communications apparatus 60 may include a transceiver unit 601 and a processing unit 602. The communications apparatus 60 is a time-sensitive networking communications apparatus, and may be an application function network element or a session management network element.

A case in which the communications apparatus 60 is the application function network element is as follows.

The processing unit 602 is configured to: determine a virtual switching node identifier corresponding to a port identifier of a user plane function network element; determine a virtual port identifier of a virtual switching node identified by the virtual switching node identifier; and obtain attribute information of the virtual switching node, where the attribute information includes attribute information of a physical port identified by the port identifier of the user plane function network element and attribute information of a virtual port identified by the virtual port identifier.

The transceiver unit 601 is configured to send the attribute information of the virtual switching node to a time-sensitive network, where the attribute information of the virtual switching node is used to request the time-sensitive network to register or update the virtual switching node based on the attribute information of the virtual switching node.

When the communications apparatus 60 is the application function network element, functions of the AF in the embodiments shown in FIG. 5 to FIG. 10A, FIG. 10B, and FIG. 10C may be implemented. For a detailed process performed by each unit in the communications apparatus 60, refer to the steps performed by the AF in the embodiments shown in FIG. 5 to FIG. 10A, FIG. 10B, and FIG. 10C. Details are not described herein again.

A case in which the communications apparatus 60 is the session management network element is as follows.

In a possible implementation, the transceiver unit 601 is configured to receive an establishment/modification request for a PDU session. The processing unit 602 is configured to select a user plane function network element for the PDU session. The transceiver unit 601 is further configured to send a second message to an application function network element, where the second message includes at least one of an identifier of the user plane function network element or a virtual switching node identifier corresponding to the PDU session, and the second message is used to request the application function network element to allocate a virtual port identifier to the PDU session. In this case, the communications apparatus 60 may implement functions of the SMF in the embodiment shown in FIG. 6A and FIG. 6B. For a detailed process performed by each unit, refer to the steps performed by the SMF in the embodiment shown in FIG. 6A and FIG. 6B. Details are not described herein again.

In a possible implementation, the transceiver unit 601 is configured to receive an establishment/modification request for a PDU session. The processing unit 602 is configured to select a user plane function network element for the PDU session, and allocate a virtual port identifier to the PDU session. The transceiver unit 601 is further configured to send a second message to an application function network element, where the second message includes the virtual port identifier. In this case, the communications apparatus 60 may implement functions of the SMF in the embodiment shown in FIG. 7A and FIG. 7B. For a detailed process performed by each unit, refer to the steps performed by the SMF in the embodiment shown in FIG. 7A and FIG. 7B. Details are not described herein again.

In a possible implementation, the transceiver unit 601 is configured to receive an establishment/modification request for a PDU session. The processing unit 602 is configured to select a user plane function network element for the PDU session. The transceiver unit 601 is further configured to send an N4 session establishment/modification request to the user plane function network element, where the N4 session establishment/modification request is used to request the user plane function network element to allocate a virtual port identifier to the PDU session. In this case, the communications apparatus 60 may implement functions of the SMF in the embodiment shown in FIG. 8A and FIG. 8B or FIG. 10A, FIG. 10B, and FIG. 10C. For a detailed process performed by each unit, refer to the steps performed by the SMF in the embodiment shown in FIG. 8A and FIG. 8B or FIG. 10A, FIG. 10B, and FIG. 10C. Details are not described herein again.

Figure 12:
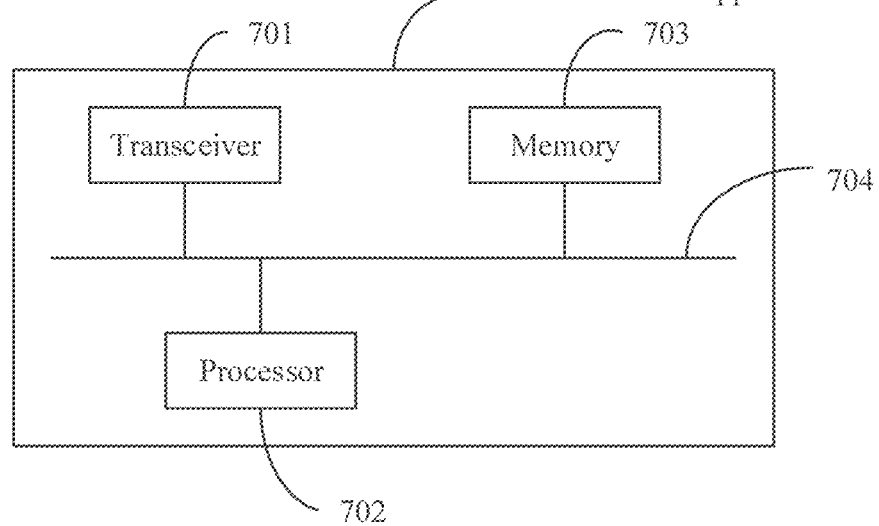
FIG. 12 is a simplified schematic diagram of a physical structure of a communications apparatus according to an embodiment of this application.

FIG. 12 is a simplified schematic diagram of a physical structure of a communications apparatus 70 according to an embodiment of this application. The communications apparatus 70 is a time-sensitive networking communications apparatus, and may be an application function network element or a session management network element.

The communications apparatus 70 includes a transceiver 701, a processor 702, and a memory 703. The transceiver 701, the processor 702, and the memory 703 may be connected to each other through a bus 704, or may be connected to each other in another manner. A related function implemented by the transceiver unit 601 shown in FIG. 11 may be implemented by the transceiver 701. A related function implemented by the processing unit 602 shown in FIG. 11 may be implemented by one or more processors 702.

The memory 703 includes but is not limited to a random-access memory (RAM), a read-only memory (ROM), an erasable programmable read-only memory (EPROM), or a compact disc read-only memory (CD-ROM). The memory 703 is configured to store a related instruction and related data.

The transceiver 701 is configured to send data and/or signaling, and receive data and/or signaling.

If the communications apparatus 70 is the AF in the embodiments shown in FIG. 5 to FIG. 10A, FIG. 10B, and FIG. 10C, the transceiver 701 may be configured to communicate with a UPF, an SMF, and a TSN, for example, perform steps S101 and S105 in the embodiment shown in FIG. 5; perform steps S101, S1035, and S105 in the embodiment shown in FIG. 6A and FIG. 6B; perform steps S201, S2037, and S205 in the embodiment shown in FIG. 7A and FIG. 7B; perform steps S301, S3038, and S305 in the embodiment shown in FIG. 8A and FIG. 8B; and perform steps S502a, S510, S515, and S516 in the embodiment shown in FIG. 10A, FIG. 10B, and FIG. 10C.

If the communications apparatus 70 is the SMF in the embodiments shown in FIG. 6A and FIG. 6B to FIG. 10A, FIG. 10B, and FIG. 10C, the transceiver 701 may be configured to communicate with an AMF, a UPF, and an AF, for example, perform steps S1033 and S1035 in the embodiment shown in FIG. 6A and FIG. 6B; perform steps S2033 and S2037 in the embodiment shown in FIG. 7A and FIG. 7B; perform steps S3033, S3035a, S3037, and S3038 in the embodiment shown in FIG. 8A and FIG. 8B; perform step S403 in the embodiment shown in FIG. 9; and perform steps S505, S507, S509, S510, S512, S513, and S515 in the embodiment shown in FIG. 10A, FIG. 10B, and FIG. 10C.

The processor 702 may include one or more processors, for example, includes one or more central processing units (CPUs). When the processor 702 is one CPU, the CPU may be a single-core CPU, or may be a multi-core CPU.

If the communications apparatus 70 is the AF in the embodiments shown in FIG. 5 to FIG. 10A, FIG. 10B, and FIG. 10C, the processor 702 may be configured to perform an operation of controlling the AF, for example, perform steps S102 to S104 in the embodiment shown in FIG. 5; perform steps S102, S1036, and S104 in the embodiment shown in FIG. 6A and FIG. 6B; perform steps S202, S2038, and S204 in the embodiment shown in FIG. 7A and FIG. 7B; and perform steps S302, S3039, and S304 in the embodiment shown in FIG. 8A and FIG. 8B.

If the communications apparatus 70 is the SMF in the embodiments shown in FIG. 6A and FIG. 6B to FIG. 10A, FIG. 10B, and FIG. 10C, the processor 702 may be configured to perform an operation of controlling the SMF, for example, perform step S1034 in the embodiment shown in FIG. 6A and FIG. 6B; perform steps S2034 to S2036 in the embodiment shown in FIG. 7A and FIG. 7B; perform steps S3034 and S3035 in the embodiment shown in FIG. 8A and FIG. 8B; perform steps S401 and S402 in the embodiment shown in FIG. 9; and perform steps S506 and S514 in the embodiment shown in FIG. 10A, FIG. 10B, and FIG. 10C.

The memory 703 is configured to store program code and data of the communications apparatus 70.

For details of the steps performed by the processor 702 and the transceiver 701, refer to the descriptions in the embodiments shown in FIG. 5 to FIG. 10A, FIG. 10B, and FIG. 10C. Details are not described herein again.

It may be understood that FIG. 12 shows a simplified design of the communications apparatus 70. In actual application, the communications apparatus 70 may further include other necessary components, including but not limited to any quantity of transceivers, processors, controllers, memories, or communications units. All devices capable of implementing this application fall within the protection scope of this application.

An embodiment of this application further provides a time-sensitive networking communications system. The time-sensitive networking communications system may include an application function network element and a session management network element. The application function network element and the session management network element may be configured to implement functions of the AF and the SMF in the embodiments shown in FIG. 5 to FIG. 10A, FIG. 10B, and FIG. 10C. For details, refer to implementation processes of the AF and the SMF in FIG. 5 to FIG. 10A, FIG. 10B, and FIG. 10C.

The time-sensitive networking communications system further includes a user plane function network element. The user plane function network element may be configured to implement functions of the UPF in the embodiments shown in FIG. 5 to FIG. 10A, FIG. 10B, and FIG. 10C. For details, refer to implementation processes of the UPF in FIG. 5 to FIG. 10A, FIG. 10B, and FIG. 10C.

A person of ordinary skill in the art may understand that all or some of the processes of the methods in the embodiments may be implemented by a computer program instructing relevant hardware. The program may be stored in a computer-readable storage medium. When the program is executed, the processes of the methods in the embodiments may be performed. The foregoing storage medium includes: any medium that can store program code, such as a ROM, a RAM, a magnetic disk, or an optical disc. Another embodiment of this application provides a computer-readable storage medium. The computer-readable storage medium stores an instruction. When the instruction is run on a computer, the computer is enabled to perform the methods in the foregoing embodiments.

Another embodiment of this application further provides a computer program product including an instruction. When the computer program product runs on a computer, the computer is enabled to perform the methods in the foregoing aspects.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, all or some of the processes or functions according to the embodiments of the present disclosure are generated. The computer may be a general-purpose computer, a dedicated computer, a computer network, or another programmable apparatus. The computer instructions may be stored in a computer-readable storage medium, or may be transmitted using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A time-sensitive networking communication method, comprising:
    determining, by an application function network element, at least one of a virtual switching node identifier or a physical port identifier, wherein the virtual switching node identifier identifies a virtual switching node, wherein the physical port identifier identifies a physical port in physical ports of the virtual switching node, and wherein the physical ports are on a user plane function network element side of the virtual switching node;
    determining, by the application function network element, a virtual port identifier of the virtual switching node, wherein the virtual port identifier identifies a virtual port in virtual ports of the virtual switching node, and wherein the virtual ports are on a user terminal side of the virtual switching node;
    obtaining, by the application function network element, attribute information of the virtual switching node, wherein the attribute information comprises first attribute information of the physical port and second attribute information of the virtual port; and
    sending, by the application function network element, the attribute information of the virtual switching node to a network configuration network element in a time-sensitive network, wherein the application function network element sends the attribute information to the network configuration network element to register or update the virtual switching node.

2. The time-sensitive networking communication method of claim 1, wherein the first attribute information comprises at least one of the physical port identifier, external topology information of the physical port, or an external transmission delay of the physical port, and wherein the second attribute information comprises at least one of the virtual port identifier, external topology information of the virtual port, or an external transmission delay of the virtual port.

3. The time-sensitive networking communication method of claim 1, further comprising receiving, by the application function network element from a user plane function network element, a first message comprising the physical port identifier.

4. The time-sensitive networking communication method of claim 3, wherein the first message further comprises the virtual switching node identifier, and wherein determining the virtual switching node identifier comprises obtaining, by the application function network element, the virtual switching node identifier from the first message.

5. The time-sensitive networking communication method of claim 3, wherein determining the virtual switching node identifier comprises allocating, by the application function network element, the virtual switching node identifier for the virtual switching node.

6. The time-sensitive networking communication method of claim 5, further comprising:

determining, by the application function network element, a correspondence between the physical port identifier and the virtual port identifier; and determining, by the application function network element, an internal processing delay between the physical port and the virtual port.

7. The time-sensitive networking communication method of claim 6, wherein the attribute information of the virtual switching node further comprises the internal processing delay.

8. The time-sensitive networking communication method of claim 1, wherein determining the virtual switching node identifier comprises obtaining the virtual switching node identifier from configuration information, and wherein the configuration information comprises a correspondence between the physical port identifier and the virtual switching node identifier.

9. The time-sensitive networking communication method of claim 1, wherein the virtual port corresponds to a session established for a user terminal.

10. The time-sensitive networking communication method of claim 1, further comprising receiving, by the application function network element from a session management network element, a second message comprising at least one of the virtual switching node identifier or an identifier of a user plane function network element.

11. The time-sensitive networking communication method of claim 10, wherein the second message requests the application function network element to allocate the virtual port identifier, and wherein determining the virtual port identifier comprises:

adding, by the application function network element according to the second message, the virtual port to the virtual switching node; and allocating, by the application function network element, the virtual port identifier for the virtual port.

12. The time-sensitive networking communication method of claim 10, wherein the second message comprises the virtual port identifier, and wherein determining the virtual port identifier comprises:

obtaining, by the application function network element, the virtual port identifier from the second message; and adding, by the application function network element, the virtual port to the virtual switching node.

13. The time-sensitive networking communication method of claim 10, further comprising determining the virtual port identifier during establishment of a session of a user terminal when the session is served by the user plane function network element.

14. The time-sensitive networking communication method of claim 1, further comprising receiving, by the application function network element, a third message from a user plane function network element, wherein the third message comprises the virtual port identifier, and wherein determining the virtual port identifier comprises:

obtaining, by the application function network element, the virtual port identifier from the third message; and adding, by the application function network element, the virtual port to the virtual switching node.

15. An application function network element, comprising:

at least one processor; and a memory coupled to the at least one processor and storing program instructions, which, when executed by the at least one processor, cause the application function network element to be configured to:

determine at least one of a virtual switching node identifier or a physical port identifier, wherein the virtual switching node identifier identifies a virtual switching node, wherein the physical port identifier identifies a physical port in physical ports of the virtual switching node, and wherein the physical ports are on a user plane function network element side of the virtual switching node;

determine a virtual port identifier of the virtual switching node, wherein the virtual port identifier identifies a virtual port in virtual ports of the virtual switching node, and wherein the virtual ports are on a user terminal side of the virtual switching node;

obtain attribute information of the virtual switching node, wherein the attribute information comprises first attribute information of the physical port and second attribute information of the virtual port; and send the attribute information to a network configuration network element in a time-sensitive network, wherein the application function network element sends the attribute information to the network configuration network element to register or update the virtual switching node.

* * * * *